United States Patent [19]
VanderPloeg et al.

[11] Patent Number: 5,895,106
[45] Date of Patent: Apr. 20, 1999

[54] NW TWISTED NEMATIC LCD WITH NEGATIVE TILTED RETARDERS ON ONE SIDE OF LIQUID CRYSTAL CELL

[75] Inventors: John A. VanderPloeg, Highland; Gang Xu, Northville; Patrick F. Brinkley, Bloomfield; Michael R. Jones, South Lyon, all of Mich.

[73] Assignee: OIS Optical Imaging Systems, Inc., Northville, Mich.

[21] Appl. No.: 08/876,043

[22] Filed: Jun. 13, 1997

[51] Int. Cl.$^6$ .................................. G02F 1/1335
[52] U.S. Cl. .................. 349/120; 349/118; 349/119; 349/121
[58] Field of Search ................. 349/119, 120, 349/117, 118

[56] References Cited

U.S. PATENT DOCUMENTS

| | | | |
|---|---|---|---|
| 5,227,903 | 7/1993 | Miyazawa et al. | 349/118 |
| 5,570,214 | 10/1996 | Abileah et al. | 349/117 |
| 5,583,679 | 12/1996 | Ito et al. | 349/118 |
| 5,594,568 | 1/1997 | Abileah et al. | 349/120 |
| 5,638,200 | 6/1997 | Xu | 349/117 |
| 5,777,709 | 7/1998 | Xu | 349/120 |

FOREIGN PATENT DOCUMENTS

| | | | |
|---|---|---|---|
| 0679921 | 11/1995 | European Pat. Off. | 349/120 |
| 0774682 | 5/1997 | European Pat. Off. | |

OTHER PUBLICATIONS

Patent Abstracts of Japan, 07253573, Mar. 10, 1995.
WO96/15473, Pub. Date May 23, 1996 –PCT.

*Primary Examiner*—William L. Sikes
*Assistant Examiner*—Kari Horney
*Attorney, Agent, or Firm*—Joseph A. Rhoa

[57] ABSTRACT

A normally white (NW) twisted nematic liquid crystal display (LCD) outputs improved viewing characteristics which are defined by high contrast ratios and/or reduced inversion. The display includes a pair of negative tilted retarders (#2 and #6) located on one side of the liquid crystal layer (#10), each of the tilted retarders including a tilt or incline angle which varies throughout the thickness of the layer. Additionally, one or two negative uniaxial or biaxial retarders (#4 and #7) are provided on the same side of the liquid crystal layer as the tilted retarders. As a result of the particular orientations, alignments, and retardation values described in the different embodiments, the display exhibits improved contrast and reduced inversion.

17 Claims, 23 Drawing Sheets

NW TWISTED NEMATIC LCD WITH NEGATIVE TILTED RETARDERS ON ONE SIDE OF LIQUID CRYSTAL CELL

RELATED APPLICATIONS

This application is related to commonly owned U.S. Pat. Nos. 5,576,861; 5,594,568; and 5,570,214; and U.S. Ser. Nos. 08/559,275, filed Nov. 15, 1995; 08/711,797, filed Sep. 10, 1996, and Ser. No. 08/768,502, filed Dec. 18, 1996, the entire disclosures of which are all hereby incorporated herein by reference. Each of these commonly owned applications and/or patents relates to a liquid crystal display with specific retarder values, contrast ratios, retarder positions or orientations, and/or retarder types.

This invention relates to a normally white (NW) liquid crystal display (LCD) including tilted and negative retardation films or retarders. More particularly, this invention relates to a NW twisted nematic (TN) LCD including a pair of tilted retarders and at least one negative retarder arranged on one side of the liquid crystal (LC) layer in a manner so as to provide improved contrast and reduced gray level inversion.

BACKGROUND OF THE INVENTION

Informational data in liquid crystal displays (LCDs) is presented in the form of a matrix array of rows and columns of numerals or characters (e.g. pixels) which are generated by a number of segmented pixel electrodes arranged in a matrix pattern. The segments are connected by individual leads to driving electronics which apply a voltage to the appropriate combination of segments and adjacent liquid crystal (LC) material in order to display the desired data and/or information by controlling the light transmitted through the liquid crystal (LC) material.

Contrast ratio (CR) is one of the most important attributes considered in determining the quality of both normally white (NW) and normally black (NB) LCDs. The contrast ratio (CR) in a normally white display is determined in low ambient conditions by dividing the "off-state" light transmission (high intensity white light) by the "on-state" or darkened transmitted intensity. For example, if the "off-state" transmission is 200 fL at a particular viewing angle and the "on-state" transmission is 5 fL at the same viewing angle, then the display's contrast ratio at that particular viewing angle is 40 (or 40:1) for the particular driving voltages utilized.

Accordingly, in normally white LCDs, a significant factor adversely limiting contrast ratio is the amount of light which leaks through the display in the darkened or "on-state." In a similar manner, in normally black displays, a significant factor limiting the contrast ratio achievable is the amount of light which leaks through the display in the darkened or "off-state." The higher and more uniform the contrast ratio of a particular display over a wide range of viewing angles, the better the LCD in most applications.

Normally black (NB) twisted nematic displays typically have better contrast ratio contour curves or characteristics than do their counterpart NW displays (i.e. the NB image can often be seen better at large or wide viewing angles). However, NB displays are optically different than NW displays and are much more difficult to manufacture due to their high dependence on the cell gap or thickness "d" of the liquid crystal layer as well as on the temperature of the liquid crystal (LC) material itself. Accordingly, a long-felt need in the art has been the ability to construct a normally white (NW) display with high contrast ratios over a large range of viewing angles, rather than having to resort to the more difficult and expensive to manufacture NB displays in order to achieve these characteristics.

What is often needed in NW LCDs is an optical compensating or retarding element(s), i.e. retardation film(s), which introduces a phase delay that restores the original polarization state of the light, thus allowing the light to be substantially blocked by the output polarizer (analyzer) in the "on-state." Optical compensating elements or retarders are known in the art and are disclosed, for example, in U.S. Pat. Nos. 5,184,236; 5,189,538; 5,406,396; 4,889,412; 5,344,916; 5,196,953; 5,138,474; and 5,071,997.

The disclosures of Ser. No. 08/559,275; and U.S. Pat. Nos. 5,570,214 and 5,576,861 (all incorporated herein by reference) in their respective "Background" sections illustrate and discuss contrast ratio, and driving voltage versus intensity (fL), graphs of prior art NW displays which are less than desirable. Prior art NW LCD viewing characteristics are problematic in that, for example, their contrast ratios are limited horizontally and/or vertically (and are often non-symmetric), and their gray level performance lacks consistency.

Gray level performance, and the corresponding amount of inversion, are also important in determining the quality of an LCD. Conventional active matrix liquid crystal displays (AMLCDs) typically utilize anywhere from about 8 to 64 different driving voltages. These different driving voltages are generally referred to as "gray level" voltages. The intensity of light transmitted through the pixel(s) or display depends upon the driving voltage utilized. Accordingly, conventional gray level voltages are used to generate dissimilar shades of color so as to create different colors and images when, for example, the shades are mixed with one another.

Preferably, the higher the driving voltage in a normally white display, the lower the intensity (fL) of light transmitted therethrough. The opposite is true in NB displays. Thus, by utilizing multiple gray level driving voltages, one can manipulate either a NW or NB LCD to emit desired intensities and shades of light/color. A gray level voltage $V_{ON}$ is generally known as any driving voltage greater than $V_{th}$ (threshold voltage) up to about 3.0 to 6.5 volts, although gray level voltages may be as low as 2.0 in certain applications.

Gray level intensity in an LCD is dependent upon the display's driving voltage. It is desirable in NW displays to have an intensity versus driving voltage curve for as many viewing angles as possible wherein the intensity of light emitted from the display or pixel continually and monotonically decreases as the driving voltage increases. In other words, it is desirable to have gray level performance in a NW pixel such that the transmission intensity (fL) at 6.0 volts is less than that at 5.0 volts, which is in turn less than that at 4.0 volts, which is less than that at 3.0 volts, which is in turn less than that at 2.0 volts, etc. Such desired gray level curves across a wide range of view allows the intensity of light reaching viewers at different viewing angles to be easily and consistently controlled. It is also desirable that all such curves have substantially the same slope.

U.S. Pat. Nos. 5,576,861 and 5,570,214 discuss, in their respective "Background" sections, prior art NW LCDs with inversion problems (e.g. inversion humps). As discussed therein, inversion humps are generally undesirable. A theoretically perfect driving voltage versus intensity (fL) curve for an NW display would have a decreased intensity (fL) for each increase in gray level driving voltage at all viewing angles. In contrast to this, inversion humps represent increase(s) in intensity of radiation transmitted or emitted from the LCD or light valve (LV) for a corresponding increase in gray level driving voltage. Accordingly, it would satisfy a long-felt need in the art if a normally white TN liquid crystal display could be provided with no or little inversion and improved contrast ratios over a wide range of viewing angles.

U.S. Pat. No. 5,583,679 discloses an LCD including an optical compensating sheet that includes a discotic structure and negative birefringence, with the discotic structure unit having an inclined plane. Unfortunately, the contrast ratios and inversion characteristics resulting from displays of the '679 patent have been found by the instant inventors to be less than desirable. Certain embodiments of the instant invention described herein exhibit surprisingly improved results with respect to contrast ratio and/or inversion as compared to the '679 patent.

Commonly owned U.S. Pat. No. 5,570,214 discloses a normally white twisted nematic LCD including retardation films on opposite sides of the LC cell. While LCDs manufactured in accordance with the teachings of the '214 patent achieved excellent viewing characteristics, it has been found by the instant inventors that such viewing characteristics can be improved upon.

Likewise, commonly owned U.S. Pat. No. 5,594,568 discloses a normally white LCD including a pair of retardation films on one side of the LC cell. Again, while displays manufactured in accordance with the teachings of the '568 patent achieve excellent results, it has been found by the instant inventors that there is room for improvement with respect to contrast ratio and inversion.

In the prior art, some have been able to separately and independently reduce inversion or improve contrast in given viewing zones, but typically if contrast is improved upon, then inversion characteristics suffer. To date, those in the art have been unable to improve both contrast and inversion in the same viewing area of a display as taught below in accordance with the instant claimed invention.

It is apparent from the above that there exists a need in the art for a normally white TN liquid crystal display wherein the viewing zone of the display has high contrast ratios and/or little or no inversion over a wide range of viewing angles. Furthermore, there exists a need in the art for improved contrast and reduced inversion in the same viewing zone (e.g. in the upper vertical viewing zone principally utilized by pilots of aircraft in avionic applications).

The term "rear" when used herein but only as it is used to describe substrates, polarizers, electrodes, buffing films or zones, and orientation films means that the described element is on the backlight side of the liquid crystal material, or in other words, on the side of the LC material opposite the viewer.

The term "front" when used herein but only as it is used to describe substrates, polarizers, electrodes, buffing films or zones and orientation films means that the described element is located on the viewer side of the liquid crystal material.

Unless otherwise specified, the actual LCDs and light valves made and/or tested herein included a liquid crystal material with a birefringent value ($\Delta n$) of 0.0854 at room temperature, Model No. ZLI-4718 obtained from Merck.

Unless otherwise specified, the term "retardation value" as used herein for uniaxial retarders means "d·$\Delta n$" of the retardation film or plate, where "d" is the film or plate thickness and "$\Delta n$" is the film birefringence (i.e. difference in indices of refraction).

The term "interior" when used herein to describe a surface or side of an element (or an element itself), means that closest to the liquid crystal material.

The term "light valve" as used herein means a liquid crystal display including a rear linear polarizer, a rear transparent substrate, a rear continuous pixel electrode, a rear orientation film, an LC layer, a front orientation film, a front continuous pixel electrode, a front substrate, and a front linear polarizer (i.e. without the presence of color filters and active matrix driving circuitry such as TFTs). Such a light valve may also include retardation film(s) disposed on either side of the LC layer as described with respect to each example and/or embodiment herein. In other words, a "light valve" (LV) may be referred to as one giant pixel without segmented electrodes.

For all circular contrast ratio graphs herein, "EZContrast" equipment available from Eldim of Caen, France (ID #204F) was used to develop these graphs. This equipment includes a system for measuring Luminance and Contrast versus viewing angle (incident (polar) and azimuth angle), utilizing 14 bits A/D conversion to give luminance measurements from 1/10 to 8,000 cd/m², with an accuracy of 3% and a fidelity of 1%. A temperature regulated CCD sensor with a photopic response (and specially designed lenses) are part of this commercially available Eldim system and corresponding software. The measurement device of this Eldim system includes a specially designed large viewing angle lens system having a numerical aperture of 0.86. The Eldim software is Windows™ 3.1 based, running on any 486 and above PC, supporting DDE interface with other programs.

Unless otherwise specified, all examples herein were carried out at approximate 25° C.

All measured real data herein, in the Examples, included the non-uniform characteristics of the backlight over a range of angles. Backlights are more intense at normal than at wide angles.

SUMMARY OF THE INVENTION

As an improvement over what is disclosed in U.S.Pat. No. 5,583,679, the instant inventors have surprisingly and unexpectedly found improved viewing characteristics as a result of: (i) $T_2$ azimuthal parallel ±10° (i.e. substantially parallel) to $P_R$; (ii) $P_R$ parallel ±10° (i.e. substantially parallel) to $B_R$, and $P_F$ likewise substantially parallel to $B_F$; (iii) the tilted retarders each oriented so that the side having the largest tilt angle (e.g. from 30°–85°) faces the backlight and is thus the first side of the retarder hit with light emitted therefrom; (iv) $T_1$ azimuthal perpendicular ±10° (i.e. substantially perpendicular) to $T_2$ azimuthal; (v) $T_1$ azimuthal anti-parallel ±10° (i.e. substantially anti-parallel) to $B_F$; and/or (vi) $T_2$ azimuthal parallel ±10° (i.e. subsantially parallel) to $B_R$. Points (i)–(vi) above are true when both tilted retarders are on the rear side of the LC layer, but are symmetrically reversed when they are instead on the front side of the LC layer. It is noted that, for example, the phrase "parallel ±10°" means parallel or within 10° of parallel in either directions.

Generally speaking, this invention fulfills the above-described needs in the art by providing a normally white TN LCD comprising:

a twisted nematic LC layer for twisting (optical rotation) at least one normally incident wavelength of visible light from about 80°–100° when in the off-state;

front and rear orientation means (e.g. alignment layers) sandwiching the liquid crystal layer therebetween, the front orientation means including a front orientation direction and the rear orientation means including a rear orientation direction different than the front orientation direction;

first and second tilted retardation layers located on the rear side of the liquid crystal layer so as to be sandwiched between a rear polarizer and the liquid crystal layer, the second tilted retardation layer disposed between the first tilted retardation layer and the liquid crystal layer;

each of the first and second tilted retardation layers defining an azimuthal angle, and a polar or incline angle which varies in at least one direction (upward or downward) through the thickness of the layer; and wherein the azimuthal angle of the first tilted retardation layer is oriented anti-parallel ±10° relative to the front orientation direction (or alignment direction), and the azimuthal angle of the second tilted retardation layer axis is oriented parallel ±10° (substantially parallel) relative to a transmission axis of the rear polarizer.

In certain preferred embodiments, the azimuthal angles of each of the first and second tilted retardation layers remain substantially fixed throughout the thickness of the layers, while the polar or incline angles of each vary either continuously or intermittently.

In certain embodiments, the display further includes first and second negative retardation layers also on the rear side of the liquid crystal layer, each of the first and second negative retardation layers being defined by one of: (i) $n_x>n_y>n_z$; and (ii) $n_x=n_y>n_z$.

In certain embodiments, each tilted retarder has a retardation value $d \cdot (n_e - n_o)$ of from about −20 to −200 nm, and preferably from about −50 to −150 nm, and most preferably from about −100 to −150 nm.

This invention will now be described with respect to certain embodiments thereof, along with reference to the accompanying illustrations, wherein:

DETAILED DESCRIPTION OF CERTAIN EMBODIMENTS OF THIS INVENTION

Figure 1:
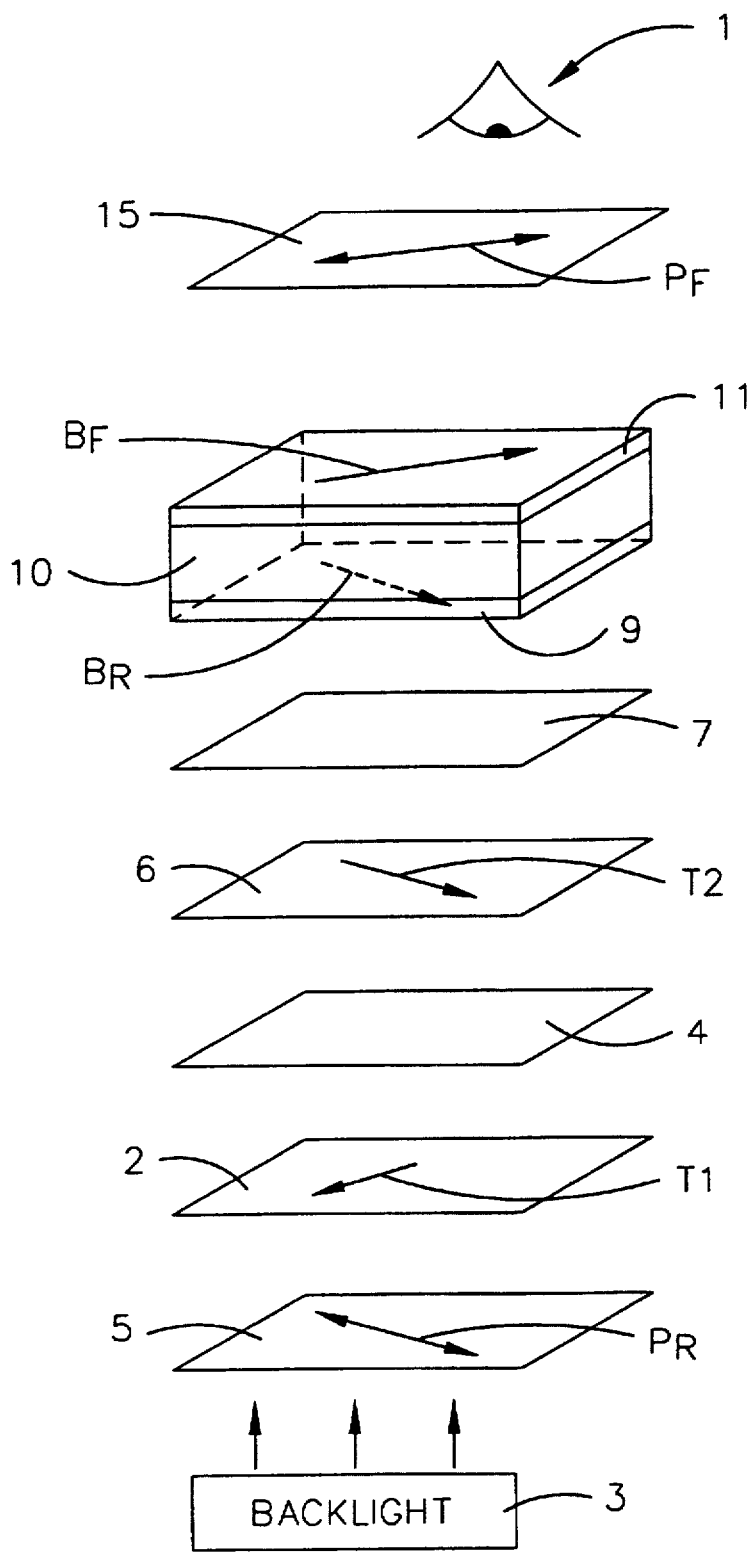
FIG. 1 is a schematic diagram of the optical components of a normally white (NW) twisted nematic (TN) liquid crystal display (LCD) including a pair of negative tilted retarders and a pair of negative non-tilted biaxial retarders all on one side of the liquid crystal layer, according to an embodiment of this invention.

Referring now more particularly to the accompanying drawings in which like reference numerals indicate like parts throughout the several views.

FIG. 1 is an exploded schematic view of the optical components, and their respective orientations, of a twisted nematic NW LCD according to a first embodiment of this invention, this LCD being either a light valve (LV) or an AMLCD having a matrix array of pixels and colored (e.g. RGB, RGBG, RGGB, or RGBW) subpixels therein according to different embodiments of this invention. As shown, this display includes from the rear forward toward viewer 1, conventional backlight 3, rear or light-entrance linear polarizer 5, first rear tilted negative uniaxial retarder 2, first rear negative retarder 4 (which may be either uniaxial or biaxial including indices of refraction $n_x$, $n_y$, and $n_z$), second rear tilted negative uniaxial retarder 6, second rear negative retarder 7 which may be either uniaxial or biaxial, rear buffing or orientation film 9, twisted nematic (TN) liquid crystal (LC) layer 10, front buffing or orientation film 11, and finally front or light-exit linear polarizer 15 (analyzer). The LCD or LV is viewed by viewer 1.

Glass substrates (discussed below) are located on opposite sides of liquid crystal layer 10 so as to be disposed, for example, between the respective orientation films and their adjacent polarizers. Driving electrodes are disposed on and between the substantially transparent substrates and their adjacent orientation layers.

A key to our invention is the surprise finding that when the negative tilted retarders 2 and 6 and negative retarders 4 and 7 referenced above are placed on one side of the LC (e.g. the rear side) and are within a particular retardation value(s) range and/or ratio, and/or are arranged in predetermined positions in the LCD, improved viewing characteristics of the display result. For example, the viewing angle of the LCD with respect to contrast ratio is wider/larger, while inversion is lessened, both in a particular viewing zone in some embodiments such as the positive vertical zone which is so important to aircraft pilots.

Retarders 2, 4, 6, and 7 are said to be "negative" as refractive index $n_z$ in each of them is less than both indices $n_x$ and $n_y$ (i.e. negative birefringence). Indices of refraction $n_x$ and $n_y$, while being co-planar, are oriented at a 90° angle relative to one another in the plane(s) of the respective film(s). Index of refraction $n_z$ is perpendicular to the plane defined by the $n_x$ and $n_y$ directions (i.e. the $n_z$ direction is normal to the film plane(s)).

Negative non-tilted retarders 4 and 7 each have a retardation value $d \cdot (n_x - n_z)$ of from about +10 to +150 nm (preferably from about +10 to +80 nm), and a retardation value $d \cdot (n_x - n_y)$ of from about −20 to +20 nm, in certain embodiments [where "d" is the thickness of the retarder or compensator]. Thus, when $d \cdot (n_x - n_y) = 0$ nm, these retarders 4 and 7 are negative uniaxial retarders and when this value is greater or less than zero they are biaxial negative retarders (they are "negative" because $n_z$ is less than each of $n_x$ and $n_y$.) Retarders 4 and 7 may be made, for example, of triacetyl cellulose (TAC) having a thickness of about 120 µm or of any of the other materials disclosed in U.S. Pat. No. 5,583,679, incorporated herein by reference. Each of these retarders may also include a thin gelatin layer thereon (0.1 µm) and a polyvinyl alcohol coating solution which is rubbed as discussed in the '679 patent.

Negative tilted anisotropic retarders or compensators 2 and 6 (e.g. made of a compound having a discotic structure unit in its molecule such as a discotic liquid crystalline compound having low molecular weight such as monomer and a polymer obtained by polymerization of a polymeric discotic LC compound) have tilted optical axes $T_1$ and $T_2$, respectively. Each retarder 2 and 6 is from about 1.5 to 3.0 µm thick according to this invention. Because each of axes $T_1$ and $T_2$ are angled relative to both the vertical and horizontal, each defines both a polar angle (i.e. tilted or inclined angle) which is the angle defined between (i) the direction normal to the disc-like molecules of the retarder, and (ii) the direction normal to the display (i.e. the normal or Z direction); and an azimuth angle which is the direction of projection $T_1$, $T_2$ of the optical axis of a retarder in the x, y, plane, as viewed from the point of view of viewer 1, as shown, for example, in FIGS. 2, 4, and 6. According to certain embodiments, the polar angle (i.e. tilt angle or inclined angle of the optical axis) of each of retarders 2 and 6 varies (either continuously or intermittently in either direction) throughout the thickness of the film while the azimuthal angle remains substantially constant. For example, the polar angle of one or both of retarders 2 and 6 may vary continuously from about 5° to 65° with increase of distance in the direction of the depth of the layer. In certain embodiments, the inclined or polar angle varies within the range of from 5° to 85° (preferably from about 10° to 80°) while the minimum polar angle in the film is in the range of from about 0° to 85° (preferably from about 5° to 40°) and the maximum polar angle is from about 5° to 90° (preferably from about 30° to 85°). See U.S. Pat. No. 5,583,679 (the disclosure of which is incorporated herein by reference) for exemplary embodiments of films 2 and 6. Preferably, each tilted retarder is oriented on the rear side of LC layer 10 so that the minimum tilt angle is closest to the LC layer 10 and the maximum tilt angle is closest to the backlight.

In certain preferred embodiments of this invention, it has been found that improved results are obtained by orienting the tilted retarders so that the light from backlight 3 hits the high tilt angle side of the retarder(s) first, travels through the retarder(s) and exits them via their low tilt side.

Tilted negative retarders 2 and 6 each include refractive indices $n_x$, $n_y$, and $n_z$, as well as extraordinary refractive index $n_e$ for the optical axis of symmetry of the discotic molecule structure, and ordinary refractive index $n_o$ which is perpendicular to $n_e$ as known in the art. According to certain embodiments of this invention, each of retarders 2 and 6 has an $n_e$ of from about 1.40 to 1.65, preferably from about 1.45 to 1.60, and an $n_o$ of from about 1.45 to 1.70, preferably from about 1.5 to 1.6. Also, each of retarders 2 and 6 has a thickness of from about 1.5 to 3.0 µm, and a $\Delta n$ (i.e. $n_e - n_o$) value of from about −0.30 to +0.20, preferably from about −0.20 to +0.10, and most preferably from about −0.10 to 0.0.

Furthermore, retarders 2 and 4 may be laminated or otherwise formed together as one unit as discussed in the '679 patent, as may retarders 6 and 7. An orientation and a subbing layer may be provided between layers 2 and 4 (and between layers 6 and 7).

Retarders 2, 4, 6, and 7 may be obtained from Fuji Photo Film Co., Ltd., Japan, or alternatively from Nitto Denko America, as WV-film.

Backlight 3 is conventional in nature and emits substantially collimated, or alternatively diffused (in Examples herein), light toward the display panel. Backlight 3 may be, for example, the backlighting assembly disclosed in U.S. Pat. No. 5,161,041, the disclosure of which is hereby incorporated herein by reference. Other conventional high intensity substantially collimated or diffuse backlight assemblies may also be used.

Rear and front polarizers, 5 and 15 respectively, may be iodine based absorption and linear in nature according to certain embodiments of this invention, and their respective linear transmission axes $P_R$ and $P_F$ are oriented perpendicular to one another (i.e. about 90° from one another ±about 10° (i.e. substantially perpendicular) in either direction) so that LCDs and LVs of the different embodiments of this invention are of the normally white (NW) twisted nematic (TN) type. Therefore, when a driving voltage (e.g. 0.0 or 0.1 V) below the threshold voltage $V_{th}$ is applied by the opposing electrodes across liquid crystal (LC) layer 10, transmission axes $P_R$ and $P_F$ of polarizers 5 and 15, respectively, are oriented such that the light emitted from backlight 3 proceeds through and is linearly polarized in direction $P_R$ by rear polarizer 5, is then twisted (e.g. from about 80° to 100°, preferably about 90°) by twisted nematic LC layer 10, and finally exits front polarizer or analyzer 15 via transmission axis $P_F$ thus reaching viewer 1 with an image. The light reaches viewer 1 because its polarization direction upon reaching front polarizer 15 is similar to the direction defined by transmission axis $P_F$. Thus, a NW display or pixel to which a voltage less than $V_{th}$ is applied is said to be in the "off-state" and appears white (or colored if color filters are present) to the viewer. These conventional polarizers 5 and 15 are commercially available from, for example, Nitto Denko America, as #G1220DUN.

However, when a substantial driving voltage (i.e. gray level voltage or full voltage greater than the threshold voltage $V_{th}$) is applied across the LC of selected NW pixels of the LCD matrix array, the light transmitted through rear polarizer 5 is not twisted as much by LC layer 10 and thus is at least partially blocked by front polarizer 15 due to the fact that the polarization direction of light reaching the interior surface of front polarizer 15 is substantially perpendicular (or otherwise non-aligned) to transmission axis $P_F$, thereby resulting in substantially no, or a lessor amount of, light reaching viewer 1 by way of the selected pixel(s) to which the substantial driving voltage (e.g. from about 3.0–6.5 volts) is applied. Thus, driven pixels in the LCD appear darkened to viewer 1, these pixels said to be in the "on-state."

In certain embodiments of this invention, transmission axis $P_R$ and transmission axis $P_F$ are oriented in a manner substantially perpendicular to one another as discussed above. However, polarizers 5 and 15 may alternatively be oriented in other manners which also render the display of the NW type.

Figure 2:
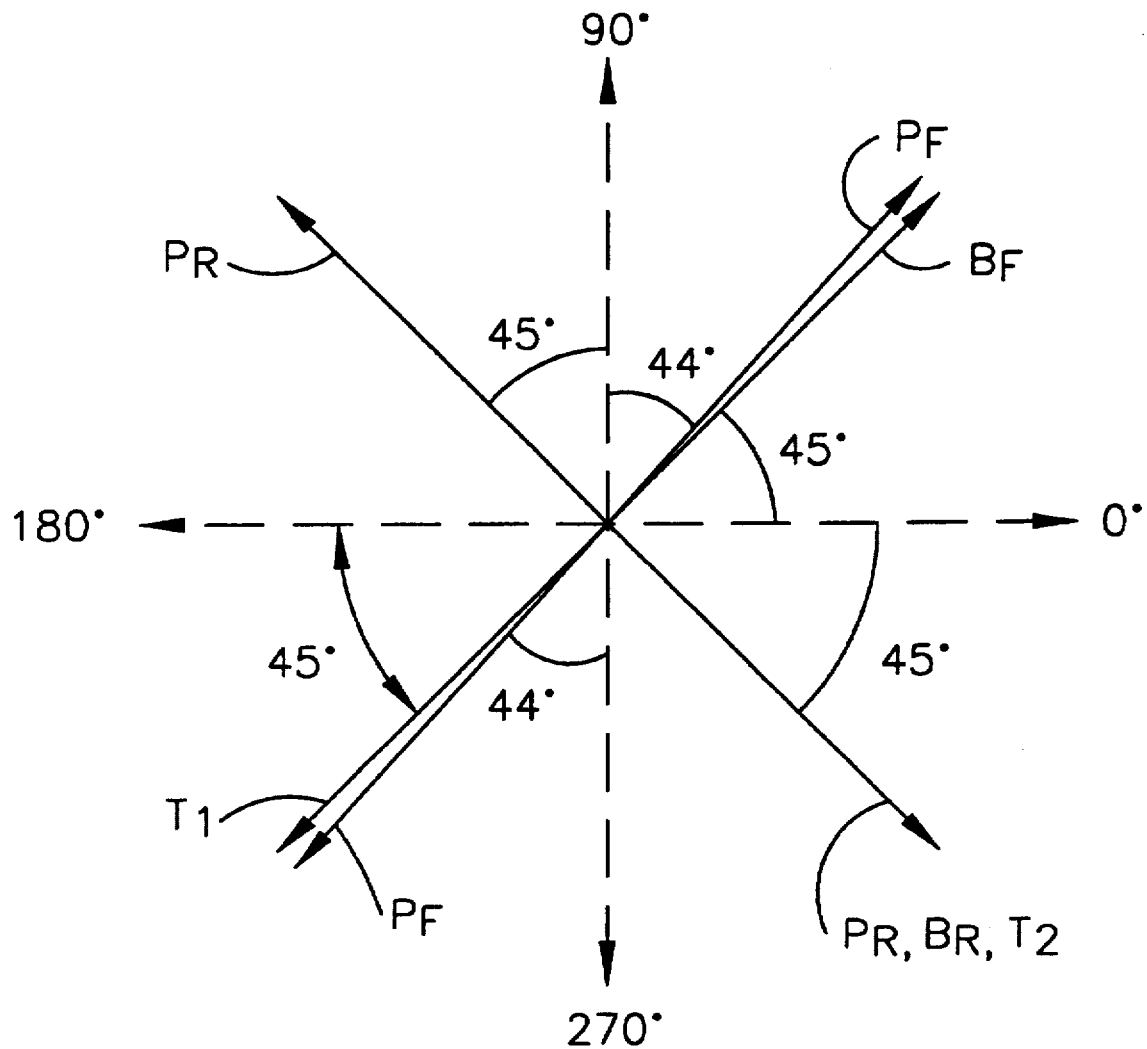
FIG. 2 illustrates the angular relationship between the respective axes of the optical components of the FIG. 1 embodiment, as viewed from the point of view of the viewer 1 (i.e. as viewed from the front of the display).
Figure 4:
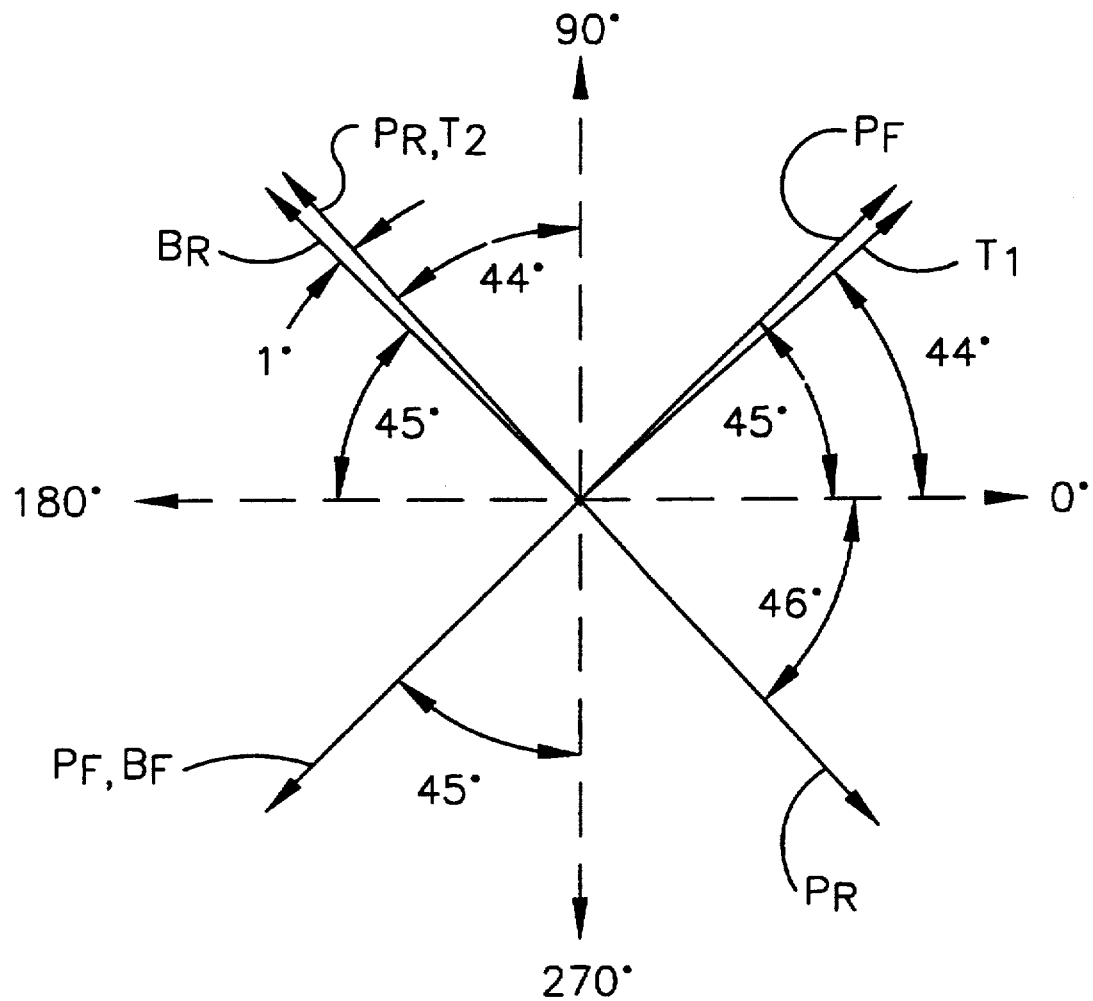
FIG. 4 illustrates the angular relationship between the respective axes of the FIG. 3 embodiment of this invention, as viewed from the point of view of the viewer.
Figure 6:
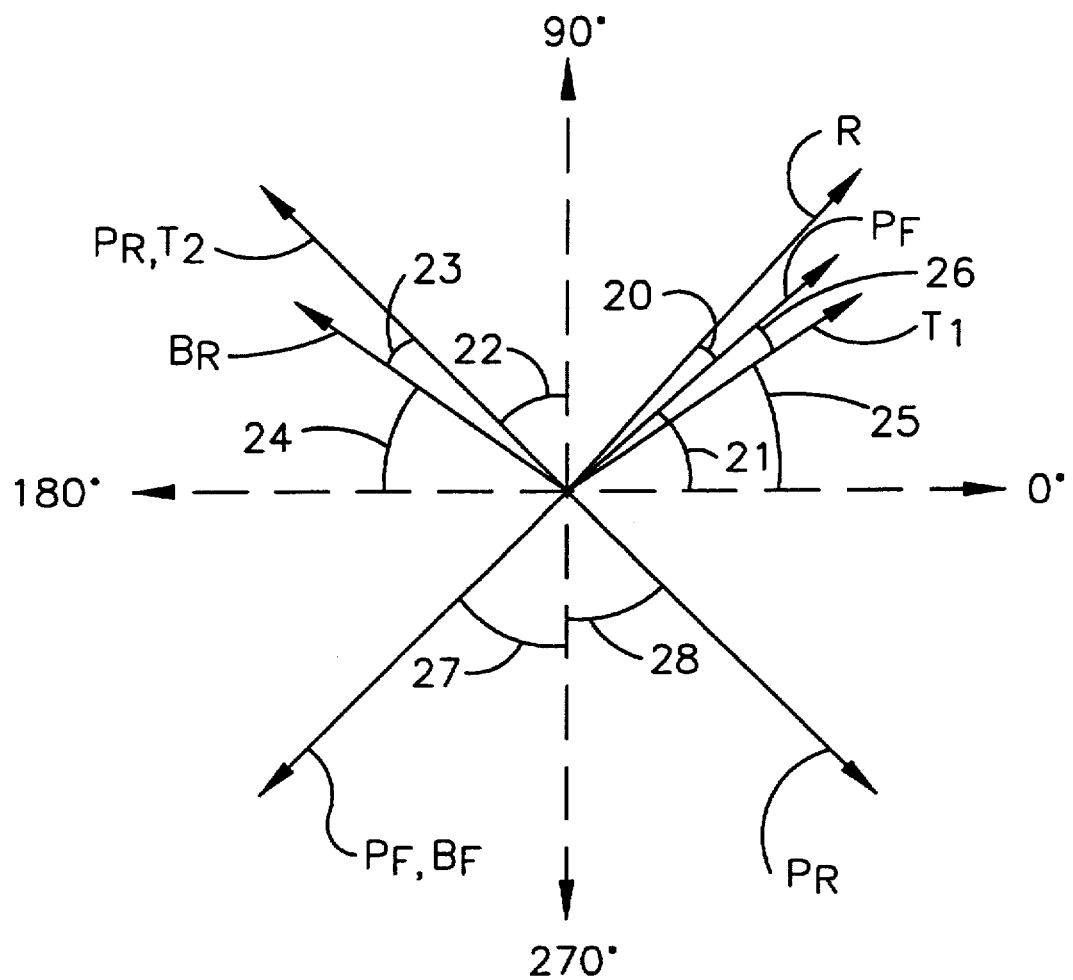
FIG. 6 illustrates the angular relationship between the respective axes of the optical components of the FIG. 5 display, as viewed from the point of view of the viewer.

Important aspects of this invention which result in the improved viewing characteristics (better contrast and less inversion) disclosed herein include (i) the substantially parallel orientation (i.e. within ±10° from parallel in either direction) of the azimuthal angle of axis $T_2$ of tilted retarder 6 relative to the transmission axis $P_R$ of the rear polarizer (see, for example, FIGS. 2, 4, and 6); (ii) each of the rear and front polarizers 5 and 15 having its transmission axis aligned parallel ±10° (i.e. substantially parallel) to the buff or alignment direction ($B_R$, $B_F$) on the same side of the LC layer; (iii) each of the tilted retarders 2 and 6 being oriented so that the side having the largest or maximum tilt angle is closest to the backlight 3 and is first hit by light emitted therefrom, and the minimum tilt side is furtherest from the backlight; (iv) the substantial perpendicular orientation of axes $T_1$ and $T_2$ (with respect to azimuthal angle); (v) the substantial anti-parallel (±about 10° from anti-parallel in either direction) orientation of the azimuthal angle of $T_1$ and front buffing direction $B_F$ [e.g. see FIGS. 2, 4, and 6] when retarders 2 and 6 are on the rear side of the LC layer [it is noted that herein "anti-parallel" means 180° from parallel]; and (vi) the azimuthal aspect of the optical axis ($T_2$) of the tilted retarder closest to the LC layer substantially parallel (±10° from parallel) relative to its most closely adjacent buffing or orientation direction. For example, in FIG. 1, the azimuthal aspect of $T_2$ is parallel to $B_R$. It is also noted that the instant inventors have found improved viewing characteristics when $P_F$ is rotated (azimuthal angle) in the counterclockwise direction, as viewed from viewer 1, relative to the other elements within this 10° range. Alternatively, $T_1$, $T_2$, and $P_R$ may be rotated clockwise relative to the other elements within this range for the best results.

Rear and front orientation or buffing films 9 and 11, respectively, are each from about 250–500 Å thick, and may be made of a substantially transparent polyimide material as is known in the art. Rear LC orientation film 9 is conventionally buffed or oriented in direction $B_R$ as shown in FIGS. 1–11. Likewise, front LC orientation film 11 is conventionally buffed in direction $B_F$. Buffing directions $B_R$ and $B_F$ are oriented substantially perpendicular to one another so as to allow the molecules of liquid crystal layer 10, when in the off or non-driven state, to be twisted from about 80° to 100°, preferably about 90°. Also, it is pointed out that the instant invention may be used in conjunction with multi-domain [e.g. two-doman] alignment applications.

Liquid crystal layer 10 has a thickness "d" of from about 3.5 to 6.5 µm according to certain embodiments, preferably from about 4.0 to 5.0 µm. LC layer 10 has a birefringent value $\Delta n$ of from about 0.08 to 0.10 according to certain embodiments, preferably from about 0.084 to 0.086 at room temperature.

Negatively birefringent tilted retardation plates or films, 2 and 6, with tilted and azimuthal angled optical axes $T_1$ and $T_2$ respectively (i.e. axes), in the FIGS. 1–2 embodiment are both disposed on the rear side of LC layer 10 in order to reduce ambient reflections off of the front of the display panel. Accordingly, retarders 4 and 7 are also on the rear side of LC 10.

Negative retarders 4 and 7 are defined by either the characteristic $n_x > n_y > n_z$, or alternatively $n_x = n_y > n_z$, where $n_x$, $n_y$, and $n_z$ are respective indices of refraction, and the "z" direction is substantially perpendicular to the film plane while the "x" and "y" directions are substantially parallel to the film plane and perpendicular to each other. According to certain embodiments of this invention, the $n_x$ index direction of retarder 4 differs from the $n_x$ index direction of retarder 7 by from about 80°–100°, preferably about 90°, while their respective planes are parallel [e.g. see FIGS. 1–11]. Negative retarders 4 and 7 are either of the C-plate type ($n_x = n_y > n_z$) or of the biaxial type ($n_x > n_y > n_z$), and may be obtained from Nitto Denko America or Nitto Corporation (Japan), or alternatively from Fuji Photo Film Co., Ltd., Industrials and Products Division, Japan.

According to certain embodiments, the retarders and polarizers herein, may all be separate sheets, although they alternatively may be all integrally formed or laminated together (or even deposited onto one another) with a known laminating material or deposition process according to certain embodiments. Thus, films 2, 4, and 5, for example, may be laminated or otherwise formed together to form a single sheet having negative tilted retarder 2, negative retarder 4, and polarizer 5. Likewise, films 6 and 7 may be formed together as one unit, although this, of course, does not affect the existence of two different retarders/films 6 and 7.

FIG. 2 illustrates the relationship between the FIG. 1 axes, from the point of view of viewer 1. As shown in FIG. 2, transmission axis $P_F$ of front polarizer 15 is substantially perpendicular to axis $P_R$ of rear polarizer 5. In this particular embodiment, the front polarizer axis $P_R$ is aligned at the 46° (and 226°) angle while the rear polarizer axis $P_R$ is at the 135° (and 315°) angle. It should be understood that these angles are exemplary only, and that the front and rear polarizer axes may be aligned at different angles according to other embodiments in this invention, provided that the display is of the normally white type. Still referring to FIG. 2, front buffing direction $B_F$ is perpendicular to rear buffing direction $B_R$. In this particular embodiment, front buffing direction $B_F$ is aligned at 45° while the rear buffing direction $B_R$ is at 315°.

With regard to tilted retarders 2 and 6, the azimuthal angle of retarder 2 (defining axis $T_1$) is substantially perpendicular to the azimuthal angle of retarder 6 (defining axis $T_2$). In this particular embodiment, $T_1$ is aligned at 225° while $T_2$ is aligned at 315°. It is also important that $T_1$ is substantially anti-parallel to $B_F$. According to the FIGS. 1-2 embodiment, $P_F$ and $B_F$ are substantially parallel to one another, while $P_R$, $B_R$, and $T_2$ are also parallel to one another, ±approximately 10° (i.e. substantially parallel).

Figure 3:
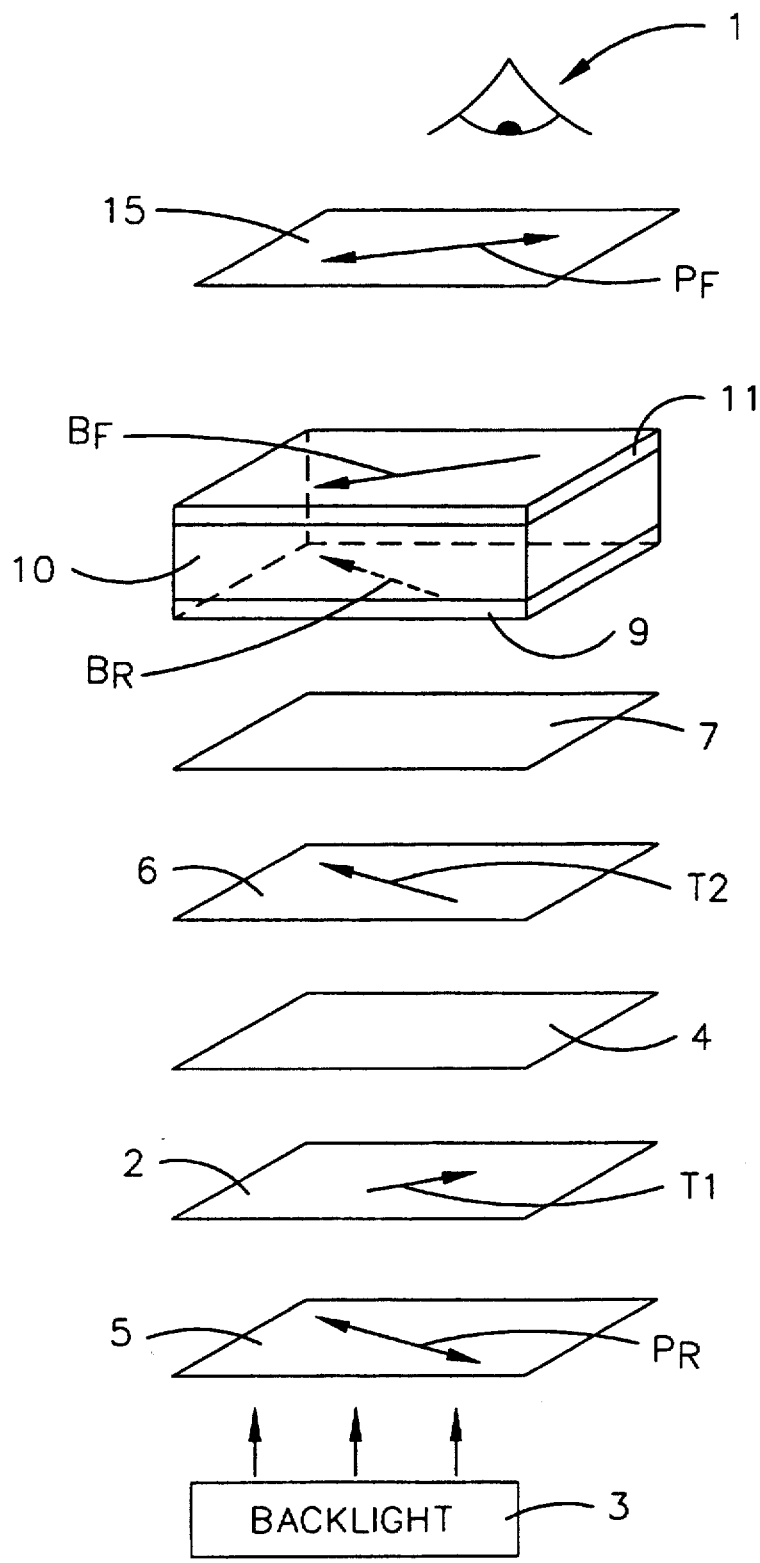
FIG. 3 is a schematic diagram of the optical components of an NW twisted nematic LCD including a pair of negative tilted retarders and a pair of negative non-tilted retarders all on one side of the liquid crystal layer, according to another embodiment of this invention.

FIG. 3 is an exploded schematic view of the optical components of an NW twisted nematic LCD (or LV) according to another embodiment of this invention. The display of FIGS. 3-4 is similar to that of FIGS. 1-2, except that in the FIGS. 3-4 embodiment, the buffing directions and azimuthal angles of the tilted retarders 2 and 6, and possibly the angles of negative retarders 4 and 7, are oriented in different directions.

As illustrated in FIGS. 3-4, axes $P_F$ and $P_R$ of the front and rear polarizers, respectively, are substantially perpendicular to one another as in the FIGS. 1-2 embodiment. However, in the FIGS. 3-4 embodiment, buffing direction $B_F$ of front buffing film 11 is in the third quadrant and is substantially parallel to front polarizer axis $P_F$ and substantially anti-parallel to axis $T_1$ (azimuthal angle) of retarder 2. Meanwhile, the rear buffing direction $B_R$ of film 9 is in the second quadrant and is substantially parallel to rear polarizer axis $P_R$ With regard to tilted retarder 6, the azimuthal angle of its tilted axis is in the second quadrant and is substantially parallel to the axis $P_R$ of rear polarizer 5. According to the specific embodiment shown in FIG. 4, $P_F$ is oriented at 45°, $P_R$ at 134°, $B_R$ at 135°, $B_F$ at 225°, $T_1$ at 44°, and $T_2$ at 134°. It should be noted that, in this embodiment and in all others herein, the polarizer axes extend through the origin and are present in two separate opposing quadrants, while the buffing directions and inclined angle azimuthal directions extend from the origin into only a single quadrant. It is important to note that although the buffing directions have changed in the FIGS. 3-4 embodiments, $P_R$ and $T_2$ are still substantially parallel, while $T_1$ and $T_2$ remain substantially perpendicular to one another and $T_1$ is substantially anti-parallel to $B_F$.

Figure 5:
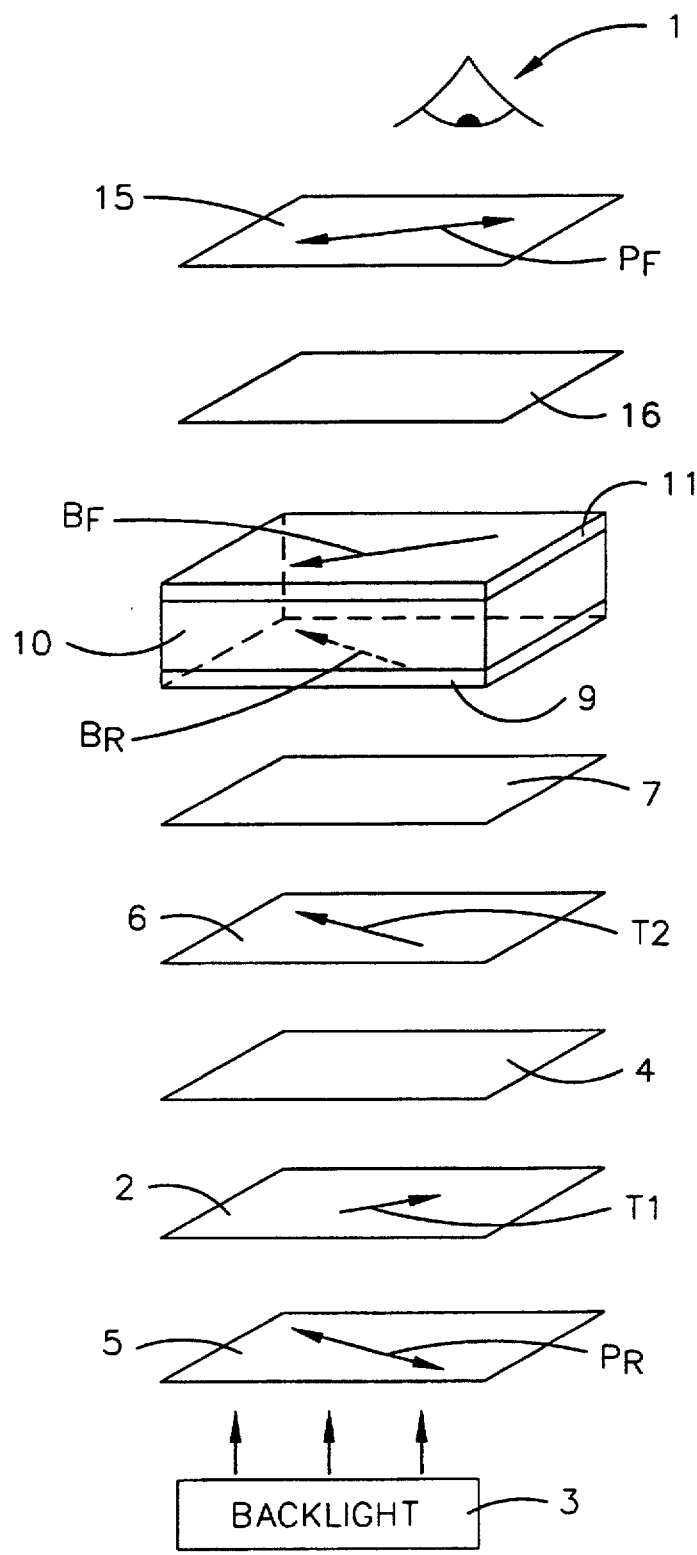
FIG. 5 is a schematic diagram of the optical components of an NW twisted nematic LCD similar to that shown in FIGS. 3–4, except that the FIG. 5 display includes an additional retarder located on the side of the liquid crystal layer opposite the tilted retarders, according to an embodiment of this invention.

FIG. 5 is an exploded schematic view of the optical components of a NW twisted nematic LCD (or LV) according to another embodiment of this invention, wherein an additional retarder 16 is located on the front side of liquid crystal layer 10. Retarder 16 may either be a positive uniaxial retarder (A-plate) having a retardation value of from about 50–200 nm, a negative uniaxial retarder (C-plate) having a retardation value of from about 50–200 nm, or a slightly biaxial negative retarder wherein $n_x>n_y>n_z$. According to certain embodiments, retarder 16 is a negative biaxial retarder having a retardation value d·$(n_x-n_z)$ of from about 0 to 100 nm (preferably about 10–50 nm, and most preferably about 30 nm), with the slight biaxial nature of retarder 16 including an axis $n_x$ directed in angular direction R as shown in FIG. 6 which is substantially parallel ± about 10° to axis $P_F$. In other respects, the FIGS. 5–6 embodiment is similar to that of FIGS. 3–4.

Turning to FIG. 6, which illustrates the angular relationship of the FIG. 5 embodiment, exemplary angles will now be described. Angle 21 defining the position of axis $P_F$ may be at from about 35° to 55°, and preferably approximately 45°; the angle 20 may be from about 0°–10°, in either direction relative to $P_F$, and preferably from about 0°–5° in either direction; angle 22 may be from about 35°–55°, preferably 45°; angle 23 may be from about 0°–10° in either direction relative to $P_R$, preferably from about 0°–5° in either direction; angle 24 may be from about 35°–55°, preferably approximately 45°; angle 25 may be from about 35°–55°, preferably approximately 45°; angle 26 may be from about 0°–10° in either direction relative to $T_1$, and preferably from about 0°–5° in either direction; angle 27 may be from about 35°–55°, and preferably approximately 45°; and angle 28 may be from about 35°–55°, and preferably approximately 450°.

Figure 7:
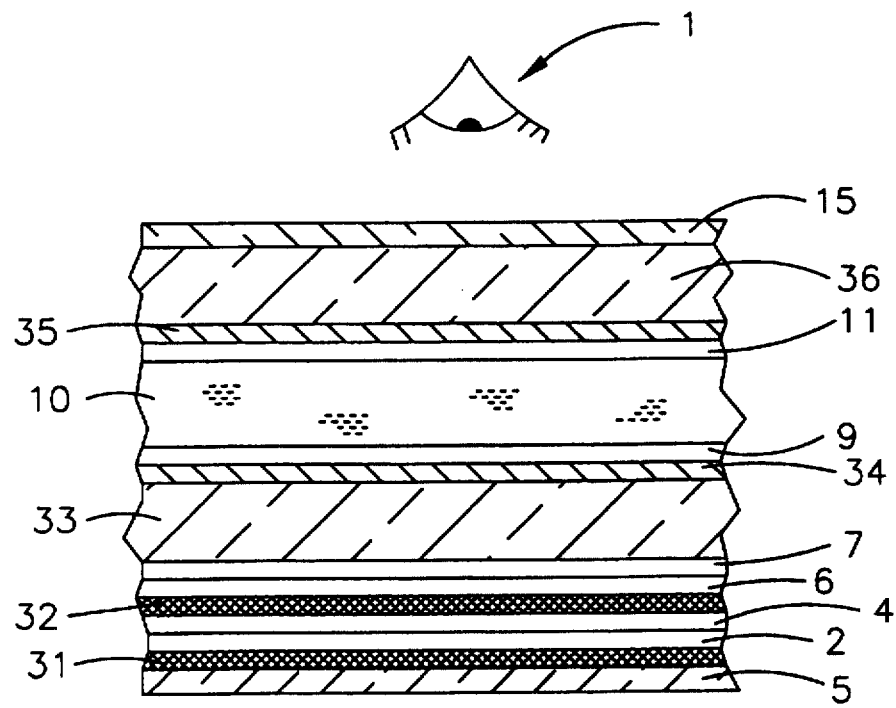
FIG. 7 is a side cross-sectional view of an NW twisted nematic LCD according to any of the FIGS. 1–4 embodiments.

FIG. 7 is a side cross-sectional view of an NW twisted nematic LCD or LV of any of FIGS. 1–4, according to certain embodiments of this invention. From the backlight forward, the display includes rear polarizer 5, adhesive layer 31, first negative tilted retarder 2, first negative retarder 4 (either uniaxial or biaxial), adhesive layer 32, second negative tilted retarder 6, second negative retarder 7 (either uniaxial or biaxial), substantially transparent glass or plastic substrate 33, conductive electrode(s) 34, rear buffing or orientation film 9, twisted nematic liquid crystal (LC) layer 10, front orientation or buffing film 11, front conductive electrode(s) 35 which functions in conjunction with rear electrode(s) 34 in order to apply voltage across LC layer 10 and/or individual pixels or subpixels defined therein, front substantially transparent glass or plastic substrate 36, and finally front polarizer 15. According to this particular embodiment, adhesive layers 31 and 32 abut the tilted retarder layers 2 and 6, respectively, and the polar or inclined angles of retarders 2 and 6 decrease (continuously or intermittently) as a function of the depth or thickness of the retarders as a function of distance from their adjacent adhesive layers 31 and 32, respectively. Thus, the incline or polar angle of the optical axis $T_1$ of retarder 2 may continuously vary, for example, from a maximum of 65° in the area of film 2 adjacent adhesive 31, to 5° adjacent retarder layer 4. Thus, in this particular example, the plane of the discotic structure in negative tilted retarder 2 has a planar incline angle that is continuously reduced from a tilt of 65° to one of 5° from the rear edge of layer 2 (i.e. the edge closest to adhesive layer 31) to the front edge of layer 2 (i.e. the edge closest to layer 4). Layer 6 has its polar or incline angle vary (continuously or intermittently) in a similar manner, so that the incline from the normal decreases as a function of distance from adhesive layer 32.

Exemplary variations of polar angles for each of retarders 2 and 6 are: (i) from 65° to 5° going away from the adhesive layer that is disposed adjacent the tilted retarder toward LC layer 10; (ii) from 50° to 20° going away from the adhesive layer that is disposed adjacent the tilted retarder; (iii) from 70° to 20° going away from the adhesive layer adjacent the tilted retarder; and (iv) from 40° to 20° going away from the adhesive layer adjacent the tilted retarder. In certain preferred embodiments, the azimuthal angles of axes $T_1$ and $T_2$ remain substantially constant while the incline angles vary either continuously or intermittently as discussed above.

While FIG. 7 shows each tilted retarder (e.g. 2) being disposed between LC layer 10 and its adjacent adhesive layer (e.g. 31), this need not be the case. For example, layers 2, 4, and 31 may be flipped over so that the adhesive 31 is between the retarder 2 and the LC 10 so that the tilt angle of layer 2 increases from, e.g. 5° to 65°, throughout layer 2 going toward LC layer 10 away from adhesive 31.

Figure 8:
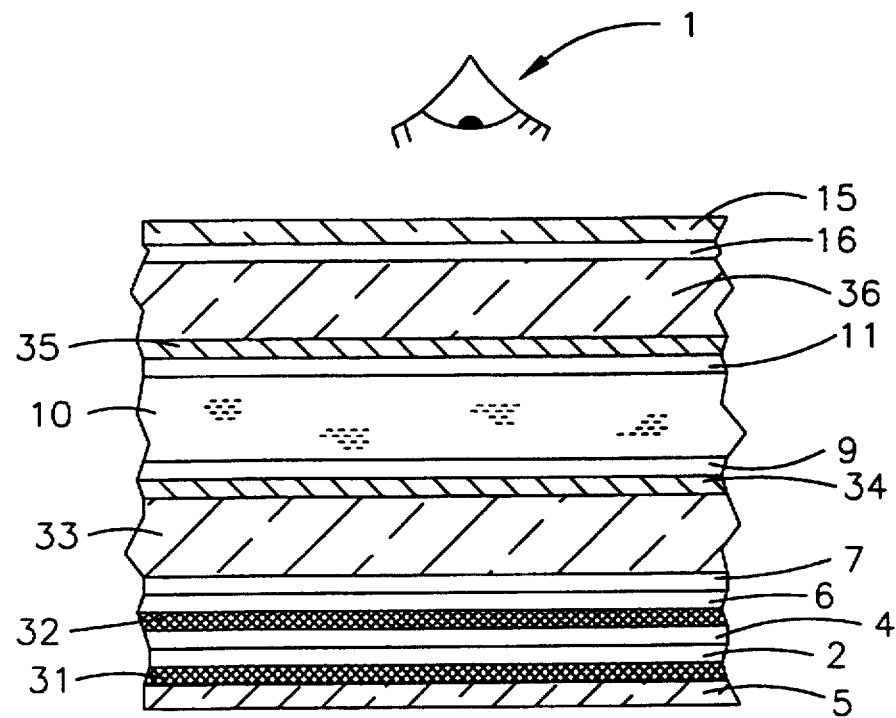
FIG. 8 is a side cross-sectional view of an NW twisted nematic LCD according to the FIGS. 5–6 embodiment.

FIG. 8 is a side cross-sectional view of the TN NW LCD or LV of FIGS. 5–6. This particular display is similar in structure to that of FIG. 7 discussed above, except that additional retarder layer 16 (discussed above) is located on the front side of LC layer 10 in between front optically transparent substrate 36 and front polarizer 15.

According to certain embodiments of this invention, the retardation value $d \cdot (n_e - n_o)$ of each of the two tilted negative retarders 2 and 6 is from about −20 to −200 nm, preferably about −50 nm to −150 nm, and most preferably from about −100 nm to −150 nm, and where $n_e < n_o$. In combination with these average tilted retarder values, it has been found that excellent results are achieved when the $d \cdot (n_x - n_z)$ birefringent value (retardation value) of each of negative retardation films 4 and 7 is from about 10 to 150 nm, more preferably from about 10 to 80 nm.

According to certain other embodiments, it has been found that improved viewing characteristics result when the retardation values of the tilted 2, 6 and negative 4, 7 retarders are maintained within a particular ratio range. The absolute value ratio of the average retardation values $d \cdot (n_e - n_o)$ of each or one of negative tilted retarders 2 and 6 to the retardation value $d \cdot (n_x - n_z)$ of each or one of retarders 4 and 7 is from about 1:1 to 3:1 (more preferably from about 1.0:1 to 2.0:1) according to certain embodiments. The retardation values of each of the like (e.g. tilted) retarders need not be identical, but the ratio range is typically met by both sets of retardation values.

Figure 9:
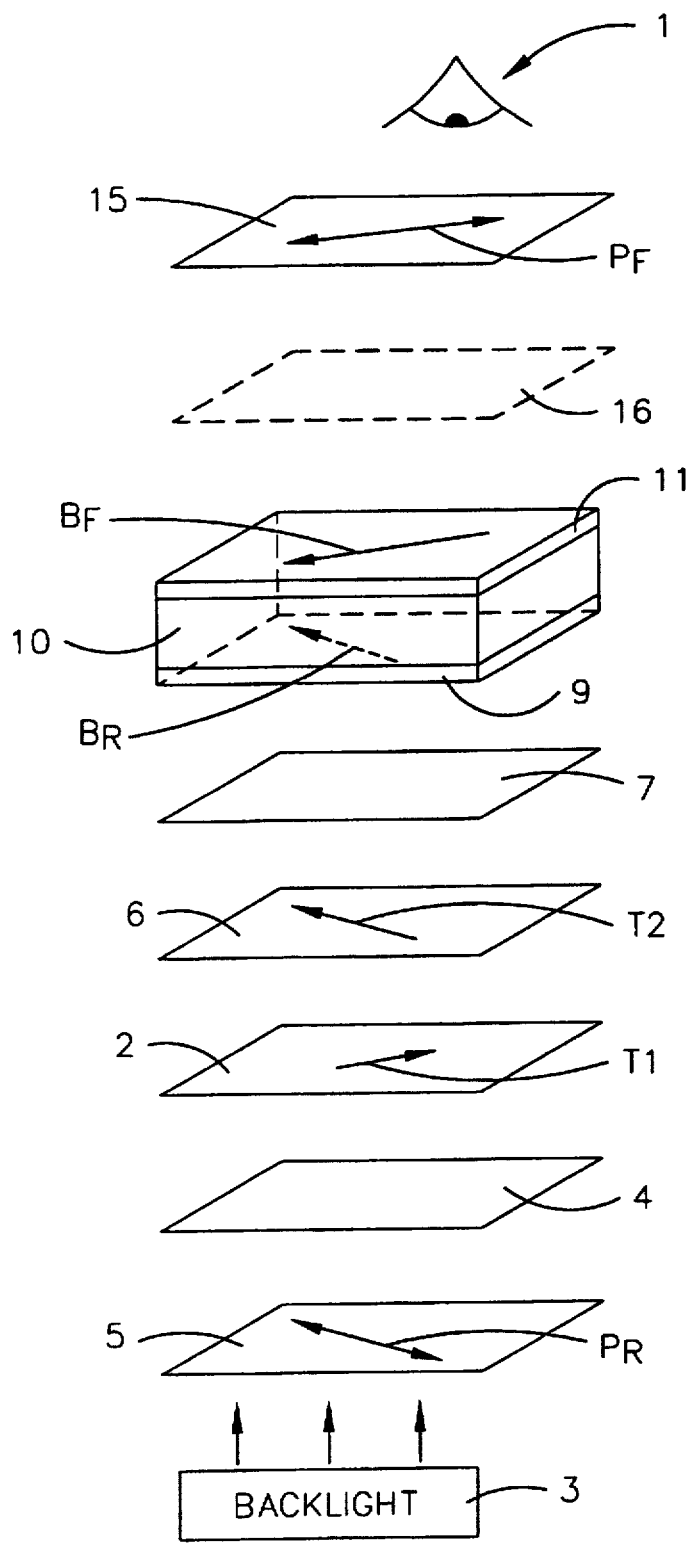
FIG. 9 is a schematic view of the optical components of an NW TN LCD according to another embodiment of this invention wherein the two tilted retarders positioned rearwardly of the LC layer are adjacent one another with no other retarders therebetween.

FIG. 9 is an exploded schematic view of an NW TN LCD or LV according to another embodiment of this invention, including optional retarder(s) 16. In this embodiment, the pair of negative tilted retarders 2 and 6 located rearwardly of LC layer 10 are sandwiched between negative retarders 4 and 7. Thus, on the rear side of the liquid crystal cell going from the backlight forward, this embodiment includes rear polarizer 5, first negative retarder 4, first tilted retarder 2, second tilted retarder 6, and second negative retarder 7. The orientation of the optical axes of the different components of the FIG. 9 embodiment are illustrated, for example, in either of FIGS. 4 and 6 discussed above.

Figure 10:
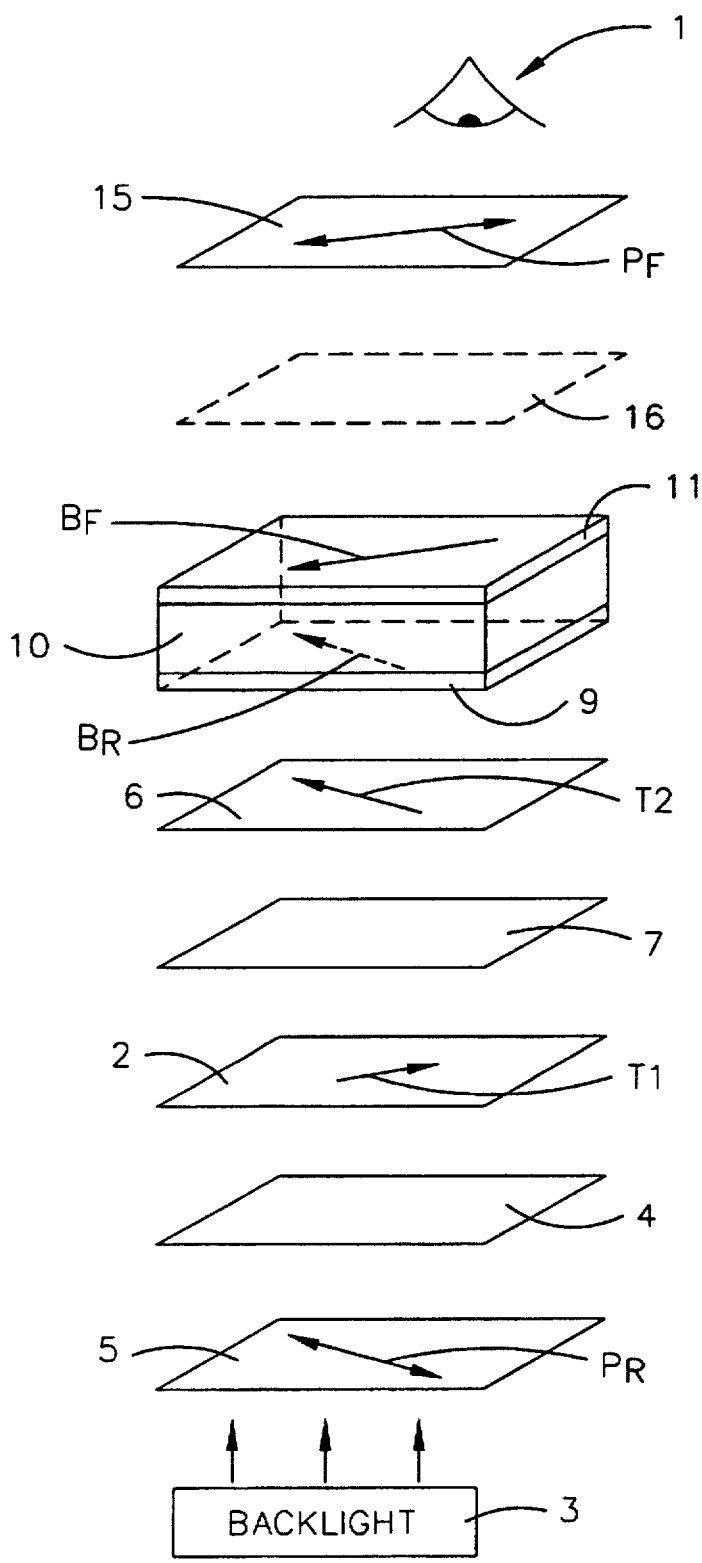
FIG. 10 is a schematic view of an NW TN LCD according to still another embodiment of this invention.

FIG. 10 is an exploded schematic view of an NW TN LCD or LV according to another embodiment of this invention, including optional retarder(s) 16. The FIG. 10 embodiment differs from those illustrated and discussed above in that tilted retarder 6 is the retarder most closely located relative to rear orientation layer 9 and retarder 4 is positioned closest to rear polarizer 5. Thus, in this embodiment, on the rear side of the liquid crystal cell, we have from the rear forward to the viewer 1, rear linear polarizer 5, negative retarder 4, first tilted retarder 2, negative retarder 7, and second tilted retarder 6. The orientation of the optical axes of the various components of this embodiment are shown, for example, in either of FIGS. 4 and 6 as discussed above.

Figure 11:
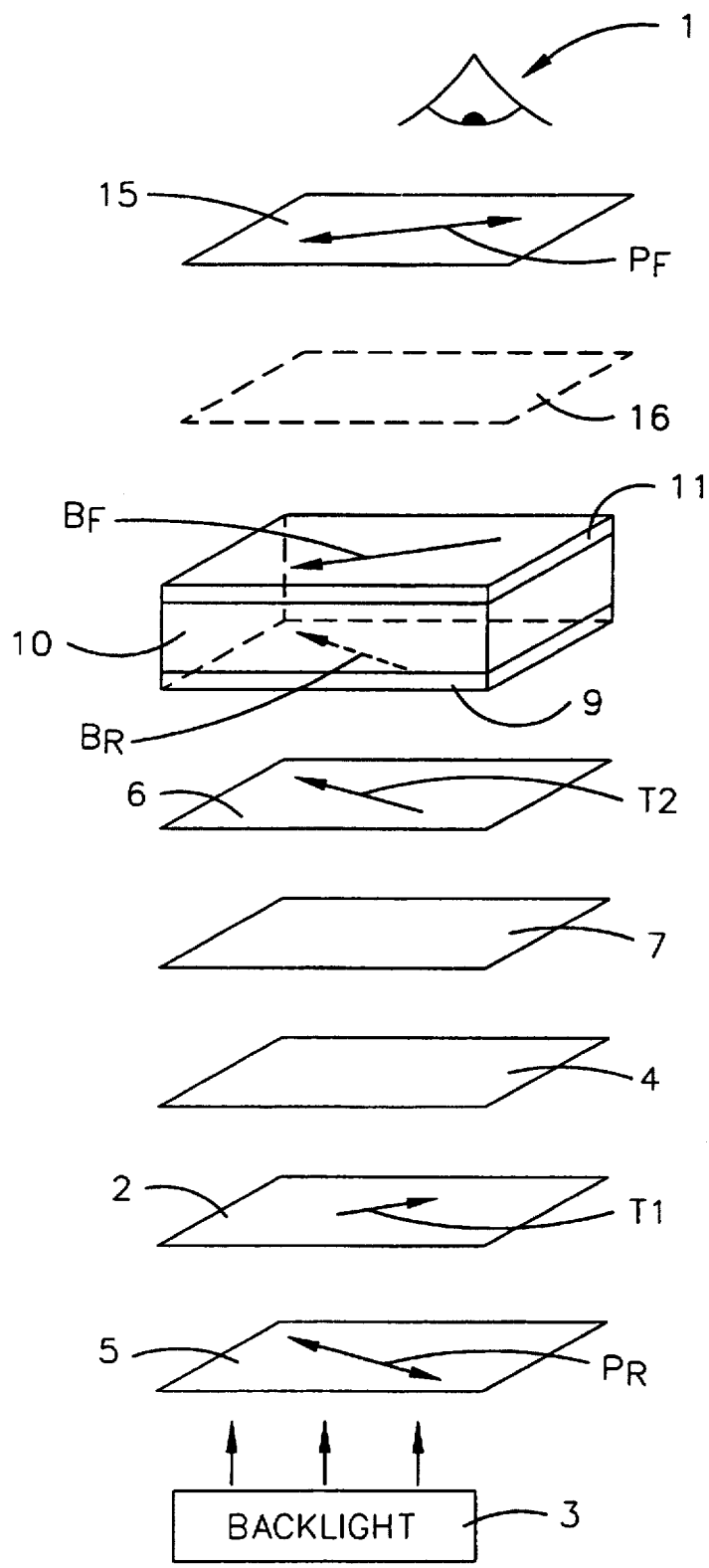
FIG. 11 is a schematic view of a NW TN LCD according to another embodiment of this invention wherein the two non-tilted negative retarders located rearward of the LC layer are surrounded by a corresponding pair of negative tilted retarders.

FIG. 11 is an exploded schematic view of an NW TN LCD or LV according to still another embodiment of this invention, including optional retarder(s) 16. In this embodiment, the two negative retarders 4 and 7 are both disposed between negative tilted retarders 2 and 6 on one side (e.g. rear) of the liquid crystal cell. Thus, we have from the rear forward, polarizer 5, tilted retarder 2, negative retarder 4, negative retarder 7, and tilted retarder 6 prior to reaching rear buffing or orientation layer 9. The optical orientation of the components of this embodiment may be illustrated, for example, in either of FIGS. 4 and 6 as discussed above. optionally, the optical axes of this embodiment may be aligned as shown in FIG. 2 above. In this and other embodiments herein, one of retarders 4 and 7 may be removed.

Each of the embodiments illustrated and discussed above includes retarders 2, 4, 6, and 7, all located on the rear side of liquid crystal layer 10. This is to avoid undesirable ambient light reflections off of the front of the display during certain applications. However, it should be understood by those of skill in the art that retarders 2, 4, 6, and 7 may optionally be located on the front side of the liquid crystal layer 10, in which case, each of the retarders would be rotated symmetrically. For example, if the retarders 2, 4, 6, and 7 of FIG. 3 were all to be positioned on the front side of liquid crystal layer 10, then they would be rotated symmetrically so that axis $T_1$ of retarder 2 (located closest to the front polarizer) would be substantially anti-parallel to the buffing direction $B_R$ of rear orientation film 9, and so on.

This invention will now be described with respect to certain examples as follows each conducted at approximately 25° C. unless otherwise specified. In each of the examples set forth below, unless otherwise indicated, the liquid crystal layer had a $\Delta n$ (or birefringent value) of 0.0854, the thickness "d" of LC layer 10 in each LV or LCD was substantially constant across the entire viewing area, the front and rear linear polarizers 5 and 15 were linear and each included both an iodined PVA layer and a TAC layer on each side of the PVA as known in the art, and the retarders 2, 4, 6, and 7 were all present and located on the rear side of liquid crystal layer 10 so as to be disposed between the liquid crystal cell and backlight 3. All polarizers were NPF-G1220DUN. In each of the Examples (exclusive of simulations) retarders 2 and 4 along with adhesive 31 were a single unit, with layer 4 including an orienting triacetyl (triacetate) cellulose (TAC) layer and an orienting layer, and layer 2 including a discotic liquid crystalline compound formed on the TAC layer, with the tilt or polar angle varying continuously downward (i.e. decreasing) going away from adhesive 31. Layers 6, 7, and 32 were similarly formed as one unit and had the same characteristics. The tilted retarders were always located between the corresponding non-tilted TAC retarder and the corresponding adhesive. The azimuthal aspect of $T_1$ was always substantially anti-parallel to $B_F$, and $T_2$ was always substantially parallel to $B_R$.

EXAMPLE 1

In this first Example, a normally white (NW) light valve (LV) was constructed as shown in FIGS. 1, 2, 7, and 12–14. This light valve had, from the rear forward, rear polarizer 5 having a PVA layer and a pair of TAC layers [NPF-G1220DUN] first tilted retarder 2, first non-tilted negative retarder 4, second tilted retarder 6, second non-tilted retarder 7, rear orientation film 9, LC layer 10, front orientation film 11, and finally front polarizer 15 [NPF-G1220DUN]. The thickness "d" of LC layer 10 was 5.2 μm and the Δn value of LC layer 10 was 0.0854. The incline or tilt angle of each of retarders 2 and 7 varied throughout the thickness of the layers from 60°–70° on the side closest to backlight 3 down to approximately 5° on the side closest to liquid crystal layer 10. In other words, the tilt or incline angle of retarder 2 was from about 60°–70° on the side of this layer adjacent polarizer 5 and it continuously varied down to approximately 5° on the side of the layer proximate retarder 4. Each of non-tilted retarders 4 and 7 was about 1.1 μm thick and was defined approximately by $n_x=n_y>n_z$ (C-plate). Meanwhile, each of retarders 2 and 6 were about 2.1 μm thick. The respective axes of the different optical components of this LV were oriented as follows: $B_F$ at 45°, $T_1$ at 225°, $P_F$ at 46° (and 226°), $P_R$ at 135° (and 315°), $T_2$ at 315°, and $B_R$ at 315°. Single units making up (i) layers 2, 4, and 31; and (ii) layers 6, 7, and 32 were obtained from Fuji as its WV film.

Figure 12:
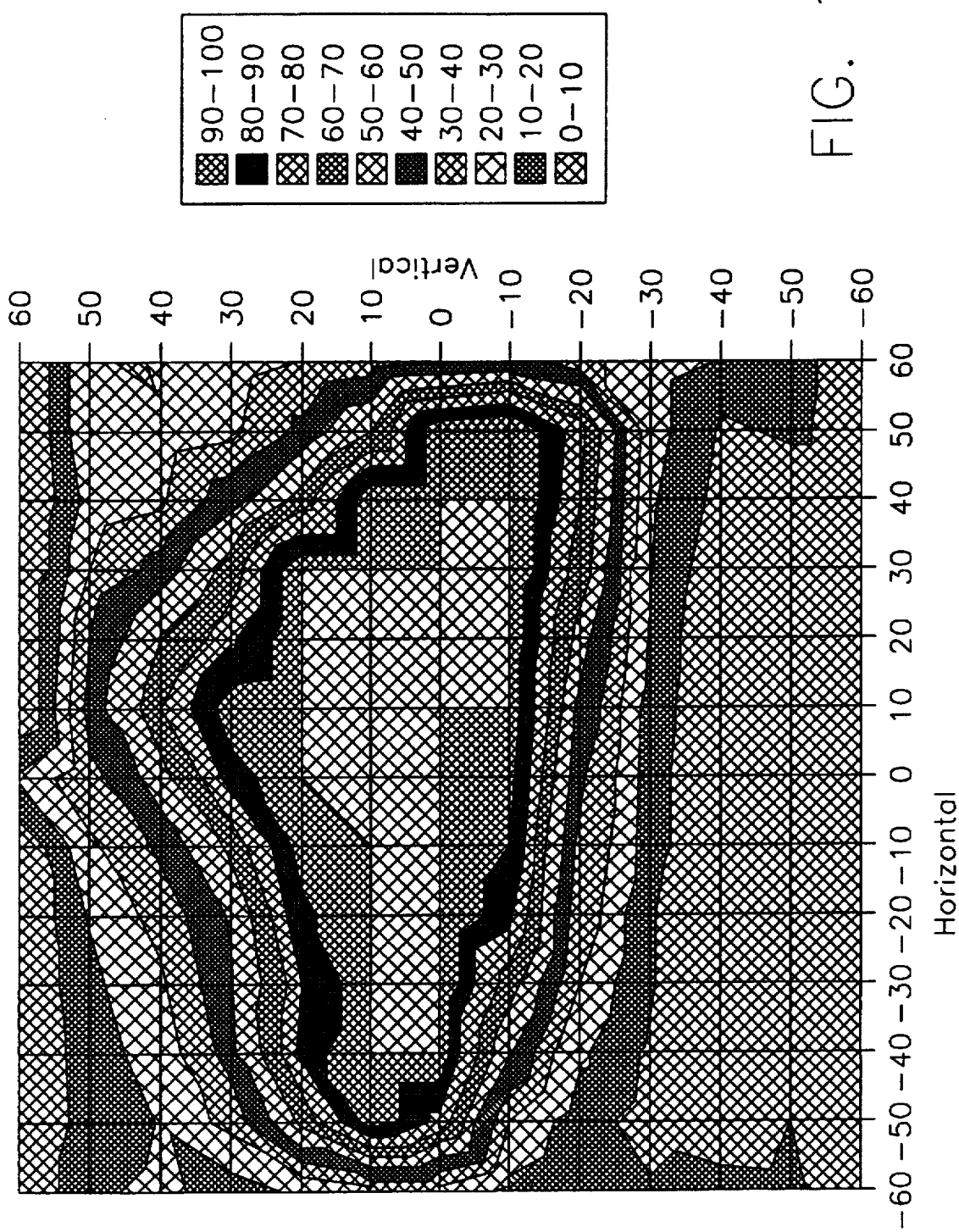
FIG. 12 is a light contrast ratio contour graph of the NW TN light valve (LV) of Example 1 herein.

FIG. 12 is a white light contrast ratio graph of the LV of this first Example, when 5.0 volts were applied in the on-state and 1.8 volts in the off-state. As illustrated, this LV exhibited very fine contrast throughout the entire viewing zone, especially in the positive vertical viewing areas. This LV exhibited contrast of at least about 30:1 over a horizontal angular span of at least about 120°, including at vertical viewing angles of 0°–10°.

Figure 13:
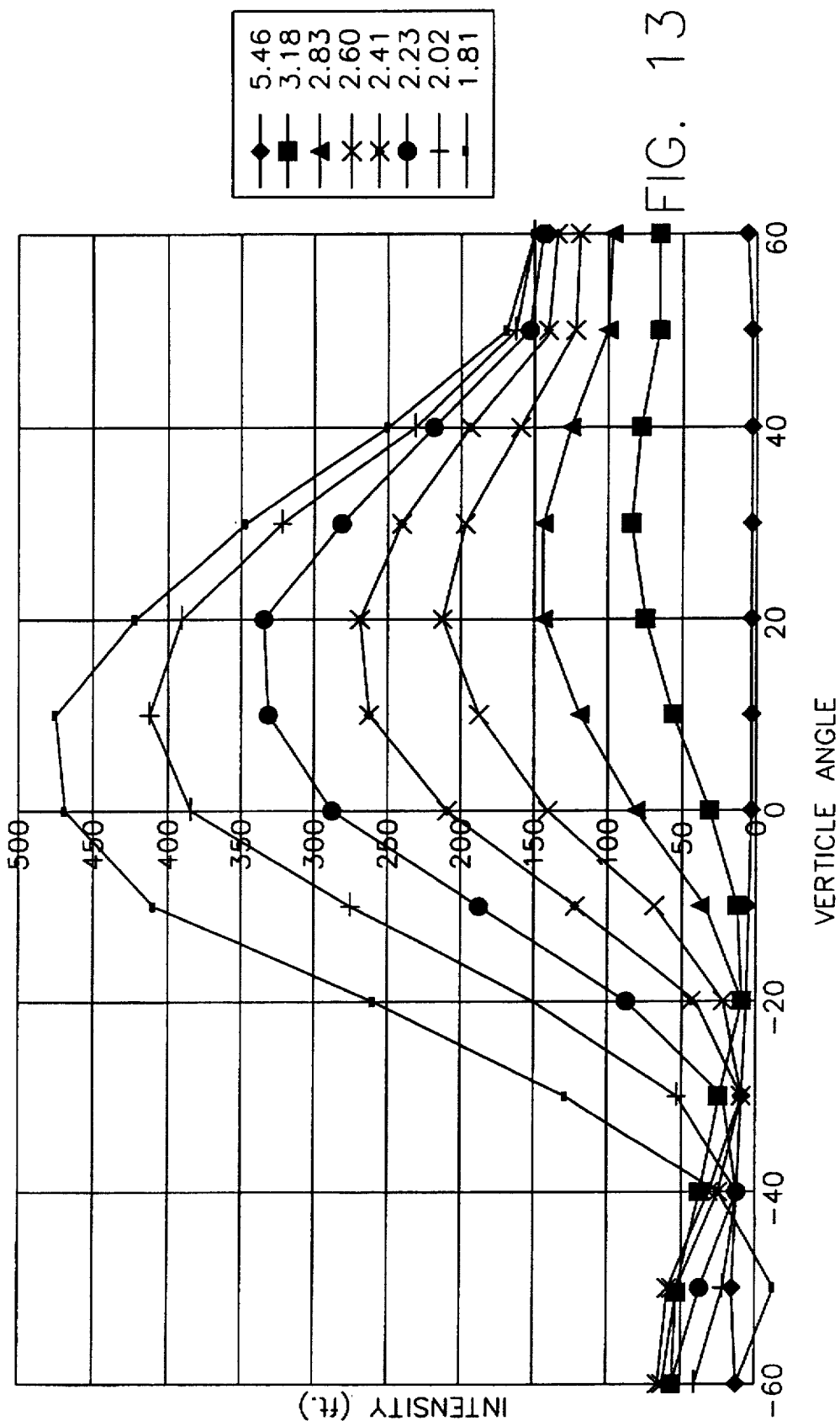
FIG. 13 is an intensity versus vertical viewing angle along the 0° horizontal viewing axis, for a plurality of driving voltages, for the light valve of Example 1 herein, this graph illustrating, from about −20° to +60° vertical virtually no gray scale inversion, good separation, each of which while maintaining high contrast shown in FIG. 12 in the viewing zone at issue.

FIG. 13 is an intensity (fL) versus vertical viewing angle plot, at a plurality of different gray level driving voltages, for the LV of this first Example along the 0° horizontal viewing axis. As shown, there is virtually no gray scale inversion from −20° vertical all the way up to +60° vertical, and there is provided excellent separation of the gray scale voltages in this particular viewing zone.

Figure 14:
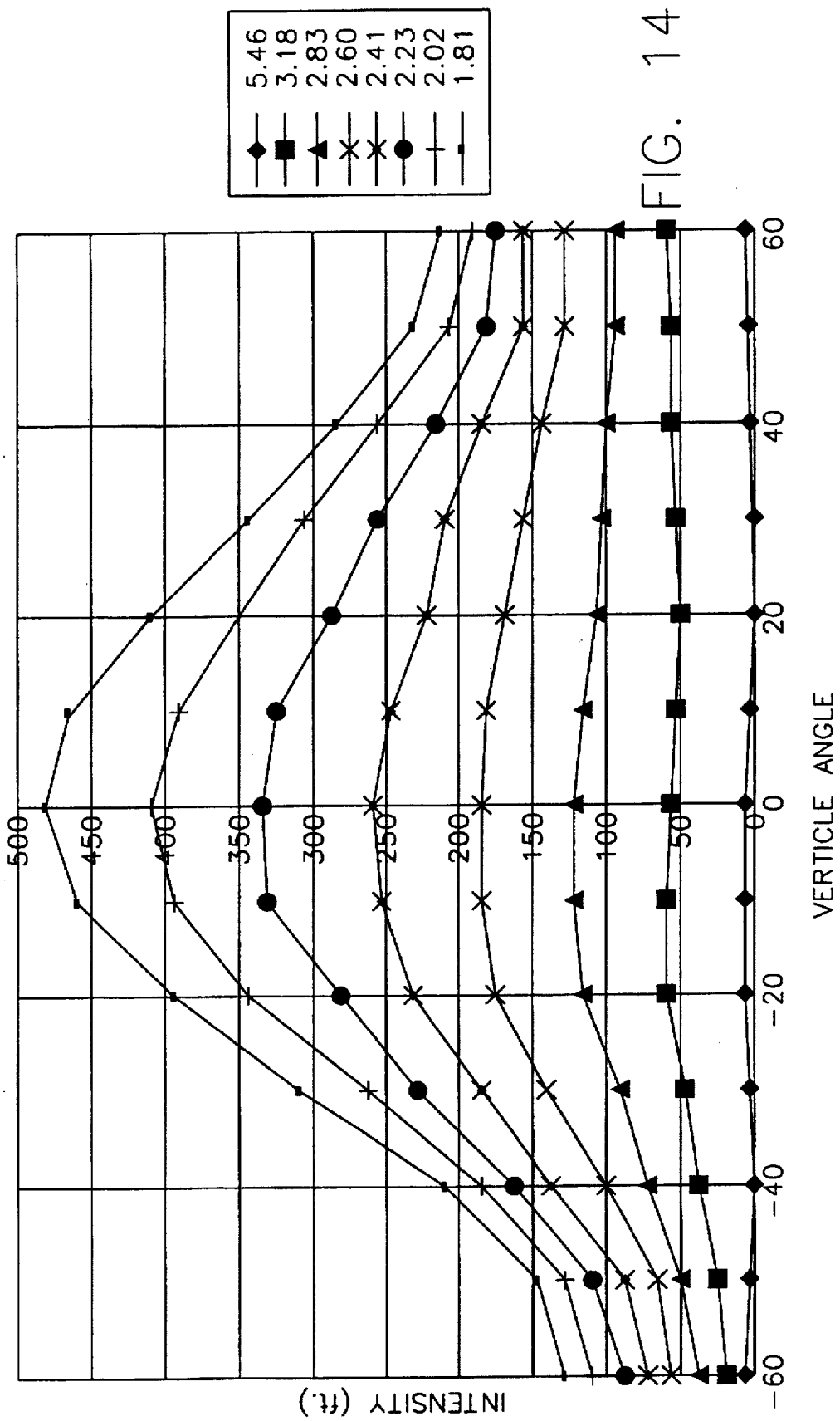
FIG. 14 is an intensity (fL) versus horizontal viewing angle graph along the 15° vertical viewing axis for a plurality of different driving voltages, for the light valve of Example 1 herein, this graph illustrating from −60° to +60° horizontal virtually no gray scale inversion and good separation, while maintaining high contrast as shown in FIG. 12.

FIG. 14 is an intensity (fL) versus horizontal viewing angle plot, at a plurality of different gray level driving voltages, for the LV of this first Example along the 15° vertical viewing axis. As illustrated, from the horizontal viewing angle of −60° to +60°, there was excellent separation, no crossovers (i.e. excellent gray scale inversion characteristics).

EXAMPLE 2

In this second Example, an NW TN LV was simulated based upon algorithms which may be found in SID 1991, pages 586–589, entitled "Application Of The Extended Jones Matrix Method To LCDs At The Oblique Incidence", by A. Lien. This simulated NW TN LV is fairly represented by FIGS. 1, 2, and 15–18 herein. From the rear forward, this LV included rear polarizer 5, negative tilted retarder 2, negative uniaxial retarder 4, negative tilted retarder 6, negative uniaxial retarder 7, rear orientation film 9, liquid crystal layer 10, front orientation film 11, and front polarizer 15. The thickness of LC layer 10 was 5.2 μm, and the Δn of the LC layer was 0.0854. For each of tilted retarders 2 and 6, they were defined by $\Delta n$ $(n_e−n_o)=−0.05$, and were each 2.50 μm thick. Each of negative uniaxial retarders 4 and 7 had a $d \cdot (n_x−n_z)$ value of 60 nm. Regarding each of tilted retarders 2 and 6, the tilt continuously varied from 76° on the side closest to backlight 3 down to 4° on the side closest to LC layer 10. The optical axes of the various components of this Example are as follows: $P_R$ at 135°, $P_F$ at 227°, $B_R$ at 315°, $B_F$ at 45°, $T_1$ at 224°, and $T_2$ at 314°.

Figure 15:
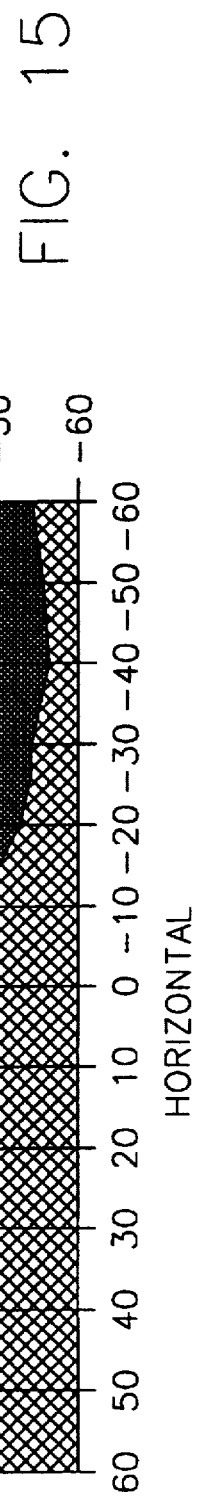
FIG. 15 is a simulated green light (550 nm) contrast ratio contour graph of the simulated NW TN LV of Example 2 herein with an off state driving voltage of 1.8 volts and an on-state driving voltage of 5.4 volts.

FIG. 15 is a green light contrast ratio of the LV of this Example when 5.4 volts were applied in the on-state and 1.8 volts in the off-state. As illustrated, excellent contrast resulted with the LV exhibiting contrast of at least 100:1 over a horizontal viewing range or extent of 110°, all the way from −60° to +50° between 10° and 20° vertical. Furthermore, the LV of this Example exhibited contrast of at least 90:1 over a horizontal span of at least 120°, and a contrast of at least 30:1 over a vertical span of at least about 105°.

Figure 16:
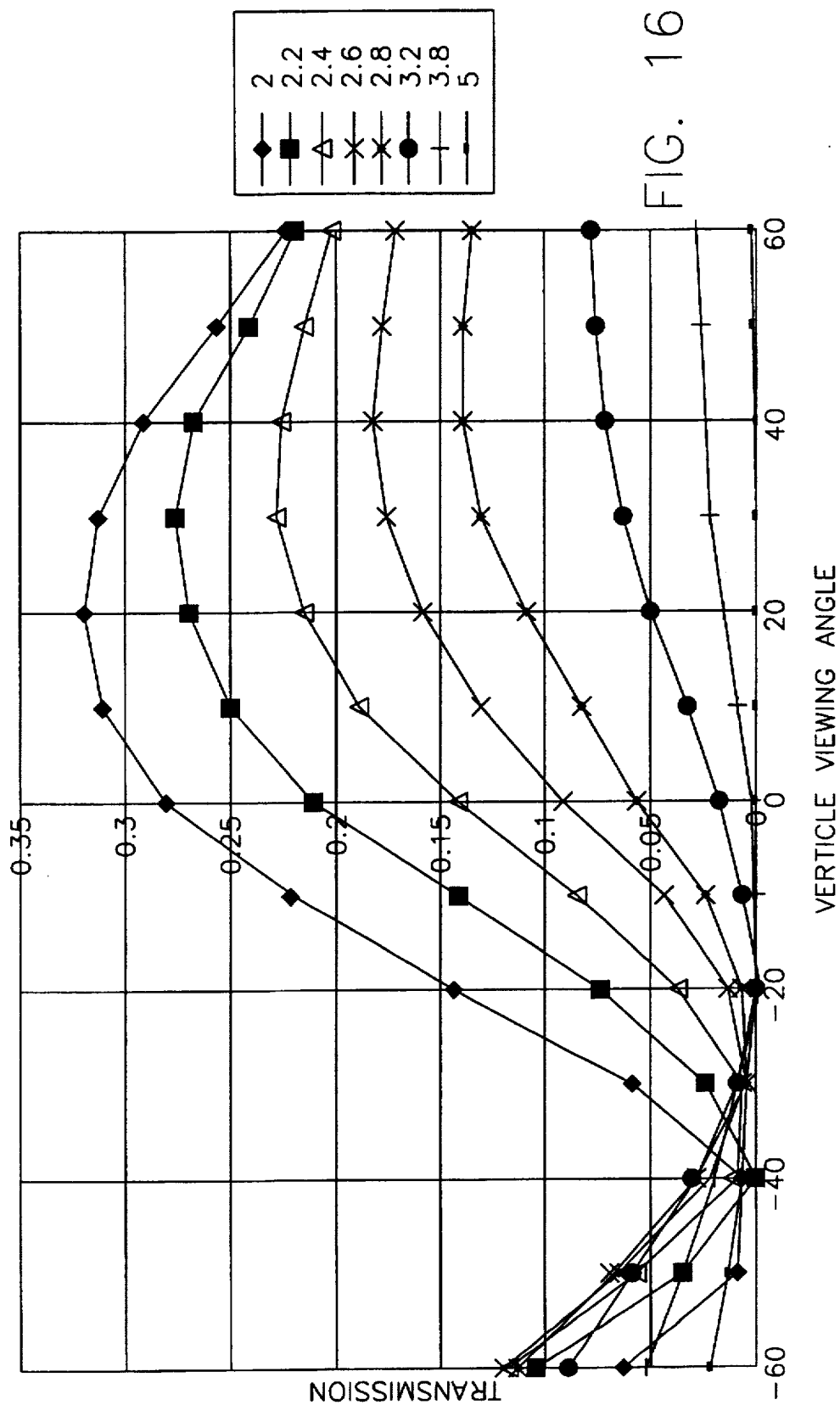
FIG. 16 is a transmission versus vertical viewing angle gray scale linearity graph along the 0° horizontal viewing axis, for a plurality of driving voltages, of the simulated LV of Example 2 herein. The transmission axis (vertical axis) represents light incident divided by light transmitted.

FIG. 16 is a transmission versus vertical viewing angle plot, along the 0° horizontal viewing axis, for a plurality of different voltages, for this LV. As can be seen, there was virtually no gray scale inversion from −5° vertical all the way up to +60° vertical. Furthermore, good gray scale separation was exhibited in this range. Thus, the display exhibited both excellent gray scale behavior and superior contrast (FIG. 15) in the same viewing zone (e.g. the upper vertical). This is an improvement over the prior art.

Figure 17:
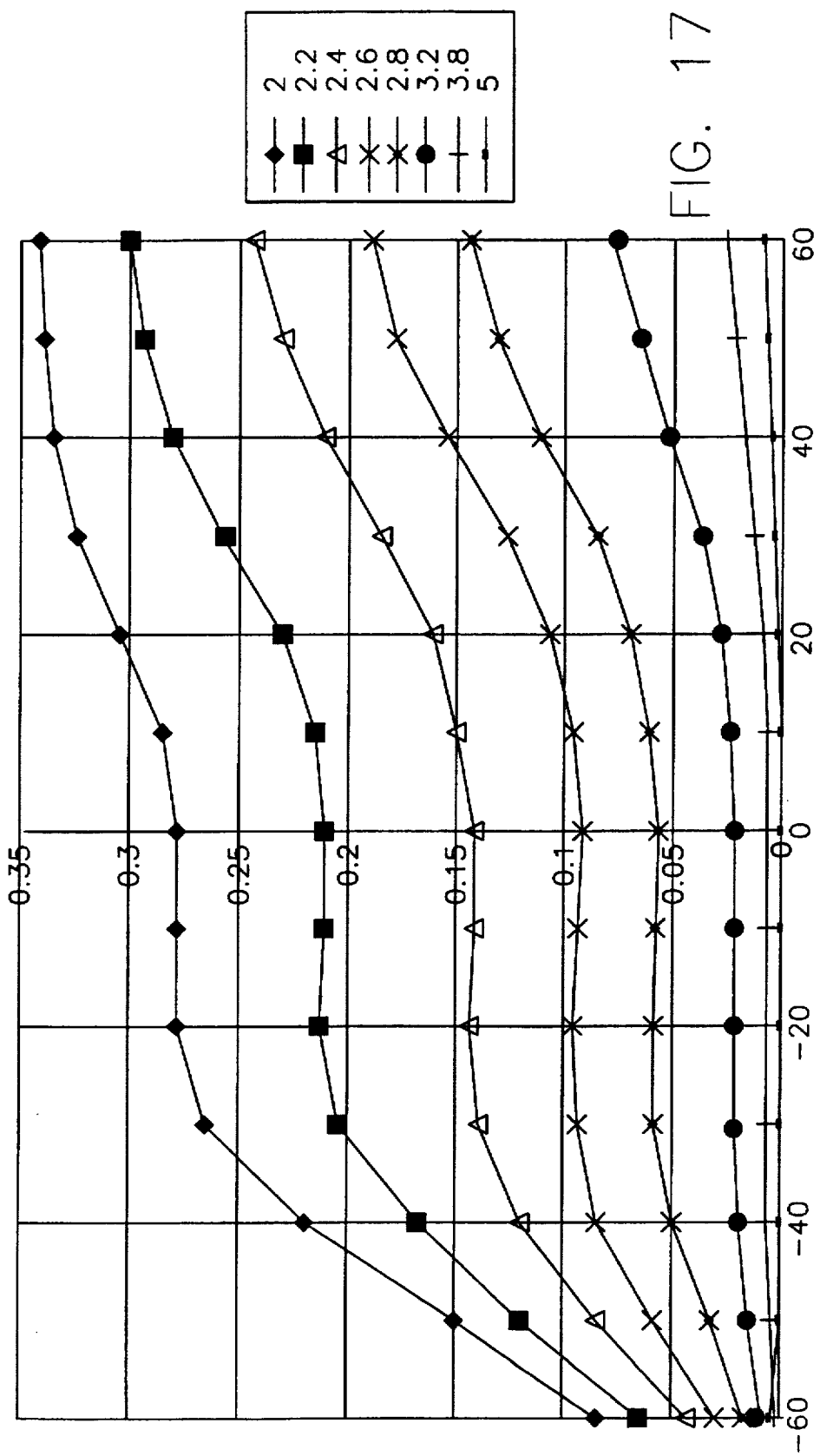
FIG. 17 is a transmission versus horizontal viewing angle gray scale linearity plot along the 0° vertical viewing axis, for a plurality of different voltages, of the simulated NW TN LV of Example 2 herein.

FIG. 17 is a transmission versus viewing angle plot of the LV of this Example, for a plurality of different driving voltages, at a plurality of different horizontal angles at the 0° vertical viewing axis. Again, excellent separation and inversion characteristics are illustrated.

Figure 18:
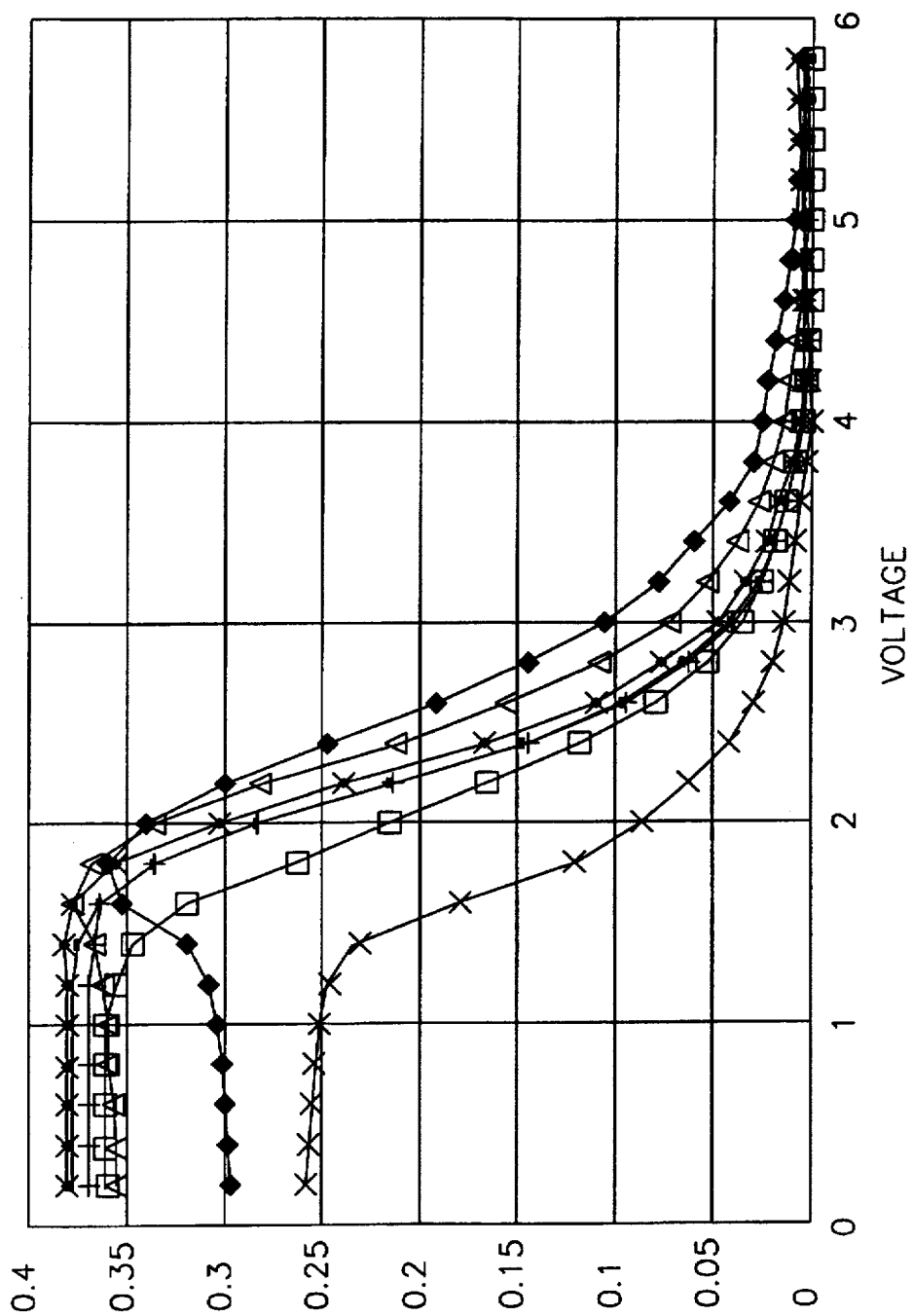
FIG. 18 is a transmission versus driving voltage (volts) plot for the simulated LV of Example 2 herein, for a plurality of different horizontal viewing angles located along the 0o vertical viewing axis.

FIG. 18 is a transmission versus voltage plot for a plurality of horizontal viewing angles along the 0° vertical viewing axis. As shown, this display exhibited excellent gray scale behavior with regard to both separation and inversion.

EXAMPLE 3

In this third Example, an NW TN RGBW AMLCD was manufactured and tested as shown substantially in FIGS. 1, 2, 7, and 19. The AMLCD of this third Example included an average cell gap "d" of about 4.9 μm. From the rear forward, this AMLCD included rear polarizer 5 (PVA and TAC), tilted retarder 2, slightly biaxial negative retarder 4, tilted retarder 6, slightly biaxial negative retarder 7, rear orientation film 9, LC layer 10, front orientation film 11, and finally front polarizer 15. The color filters, driving electrodes, glass substrates, and driving TFTs were also included as this was a full AMLCD. Retarders 2 and 4 along with adhesive 31 were obtained as a single unit from Fuji, as were retarders 6 and 7 and adhesive 32, as its WV film. See U.S. Pat. No. 5,583,679. The optical axes of the various components of this Example were oriented as follows: $P_F$ at 46°, $P_R$ at 135°, $B_F$ at 45°, $B_R$ at 315°, $T_1$ at 225°, and $T_2$ at 315°. The retardation value $(n_x−n_z) \cdot d$ for each of retarders 4 and 7 was approximately 40 nm, while the retardation value $|n_x−n_y| \cdot d$ was believed to be from about 3–6 nm. The tilt or incline angle for each of retarders 2 and 6 varied from in the range of 60°–70° nearest the backlight down to around 5° on the side closest to the liquid crystal layer. As in all embodiments herein, the azimuthal angle remain constant in each of retarders 2 and 6 while the tilt angle varied throughout the thickness of the layers.

Figure 19:
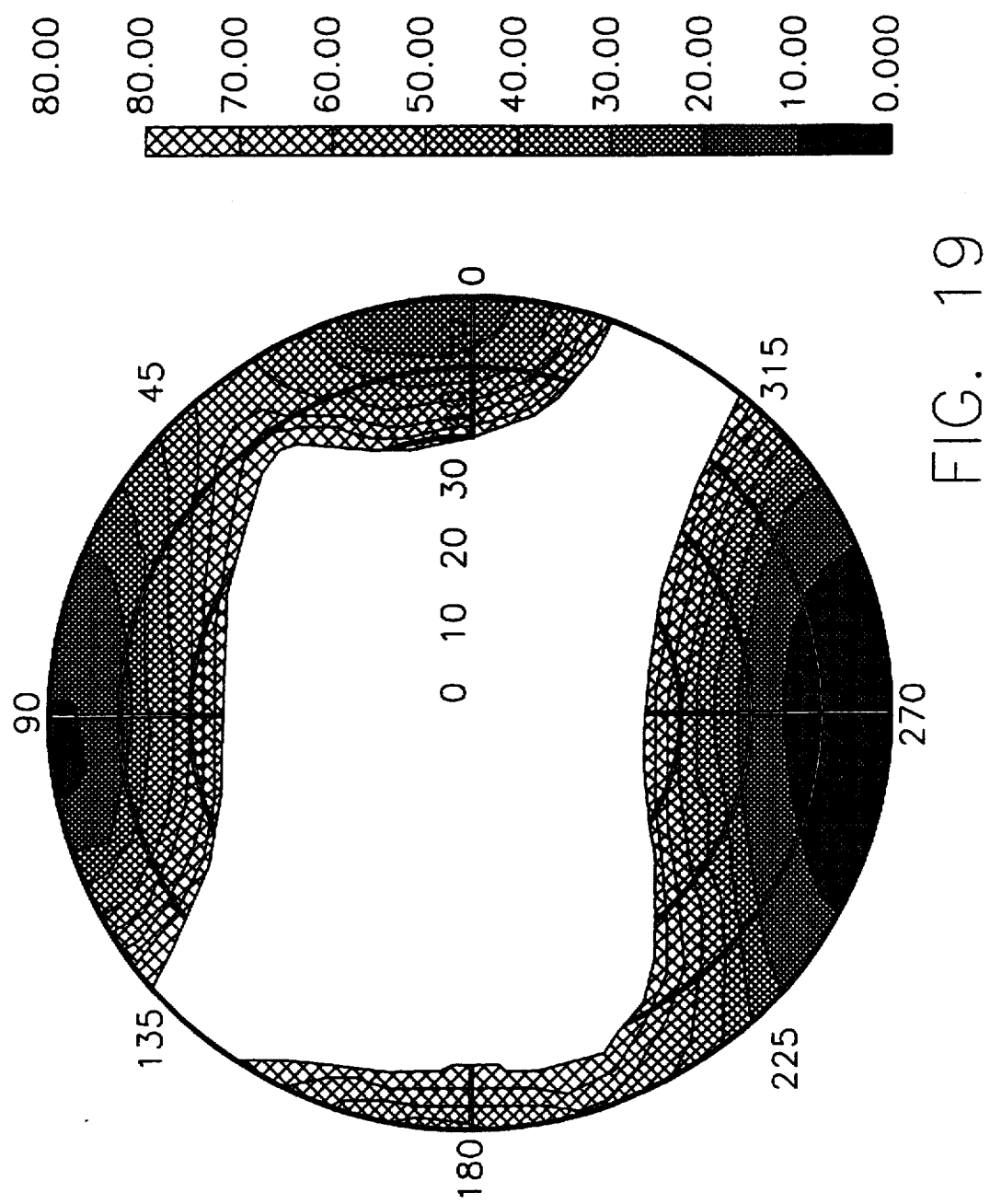
FIG. 19 is a white light contrast ratio graph of the Example 3 NW thin film transistor (TFT) RGBW AMLCD, with an off-state driving voltage of 1.73 volts (i.e. white voltage) and an on-state driving voltage of 5.77 volts (darkened voltage).

FIG. 19 is a white light contrast ratio graph of the AMLCD of this third Example when 5.77 volts were applied in the on-state and 1.73 volts in the off-state. As can be seen, this AMLCD exhibited excellent contrast ratios throughout the viewing zone. The maximum measured contrast ratio, at the "+", was 373.48, while the minimum was 2.89.

EXAMPLE 4

In this fourth Example, an NW TN LV was manufactured and tested as follows. This LV is generally illustrated in FIGS. 5, 6, 8, and 20 herein. The LC layer 10 of this LV had a thickness of 5.20 μm. This LV included from the rear forward, rear polarizer 5, tilted retarder 2, slightly biaxial negative retarder 4, tilted retarder 6, slightly biaxial negative retarder 7, rear orientation film 9, LC layer 10, front orientation film 11, slightly biaxial negative retarder 16 obtained from Kodak, and finally front polarizer 15. The retardation value of retarder 16 (which was almost, but not quite, a negative uniaxial retarder) was −30 nm. Retarders 2, 4, 6, and 7 were obtained from Fuji and configured as discussed in Example 3 above. Retarder 16 had a retardation d·($n_x$−$n_z$) of about 30 nm. The various optical axes of this LV were oriented as follows: $P_R$=134°, $P_F$=45°, $B_R$=135°, $B_F$=225°, $T_1$=44°, $T_2$=134°, and a slight biaxial $n_x$ axis of retarder 16 at approximately 46°.

Figure 20:
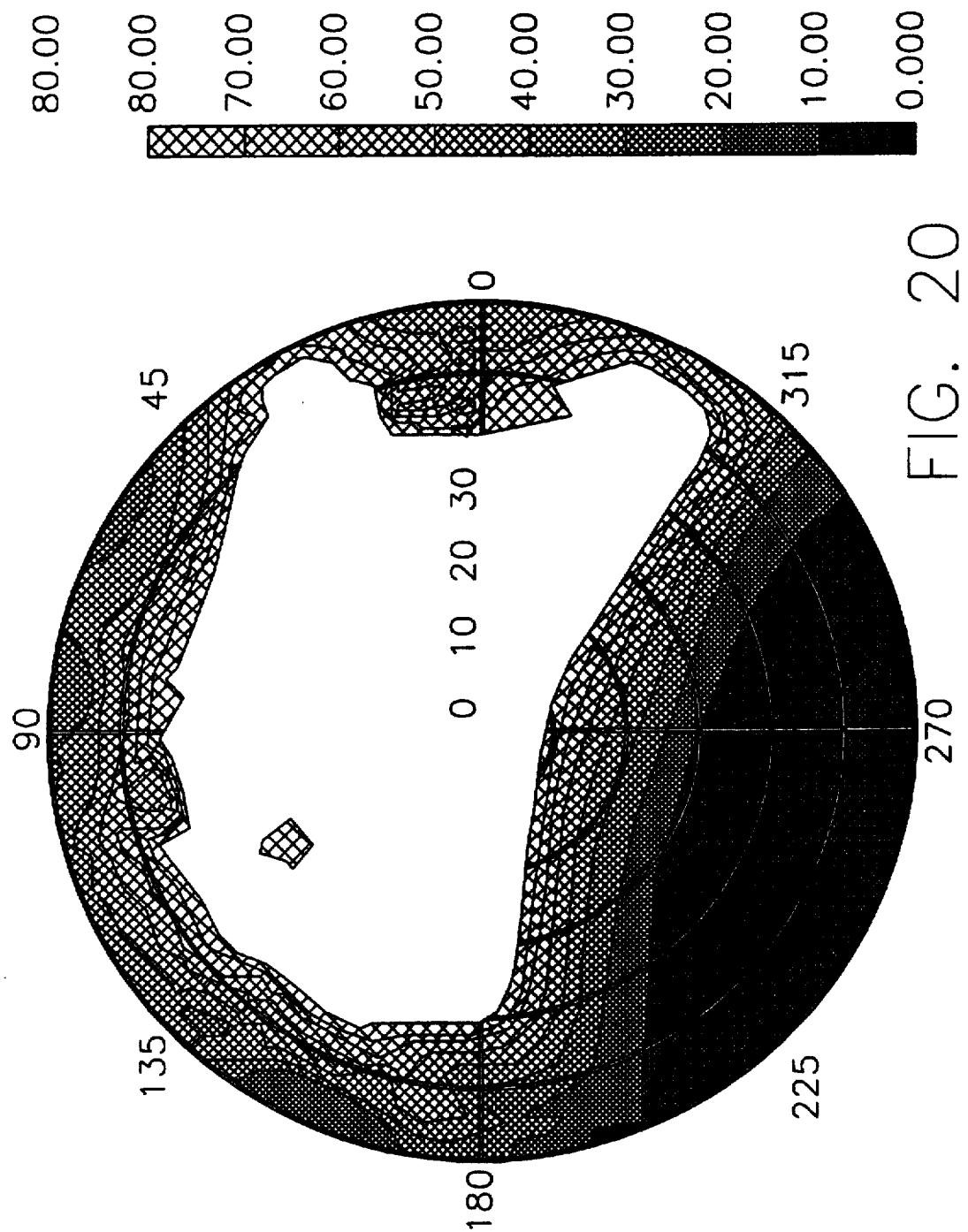
FIG. 20 is a white light contrast ratio graph of the NW TN LV of Example 4 herein, with an off-state driving voltage of 1.8 volts and an on-state driving voltage of 5.5 volts, this LV including in addition to the negative tilted and non-tilted retarders on the rear side of the LC, a slightly biaxial retarder located on the front side of the liquid crystal layer.

FIG. 20 is a white light contrast ratio graph of the LV of this fourth Example, when 5.5 driving volts were applied in the on- (or darkened) state and 1.5 volts in the off- (or whitened) state. The maximum contrast was 341.53 while the minimum was 0.48.

FIG. 20 should be interpreted by adding 180° to each of the angles defined in this Example, because it was taken upside down. This is also the case for FIGS. 21–23.

EXAMPLE 5

Figure 21:
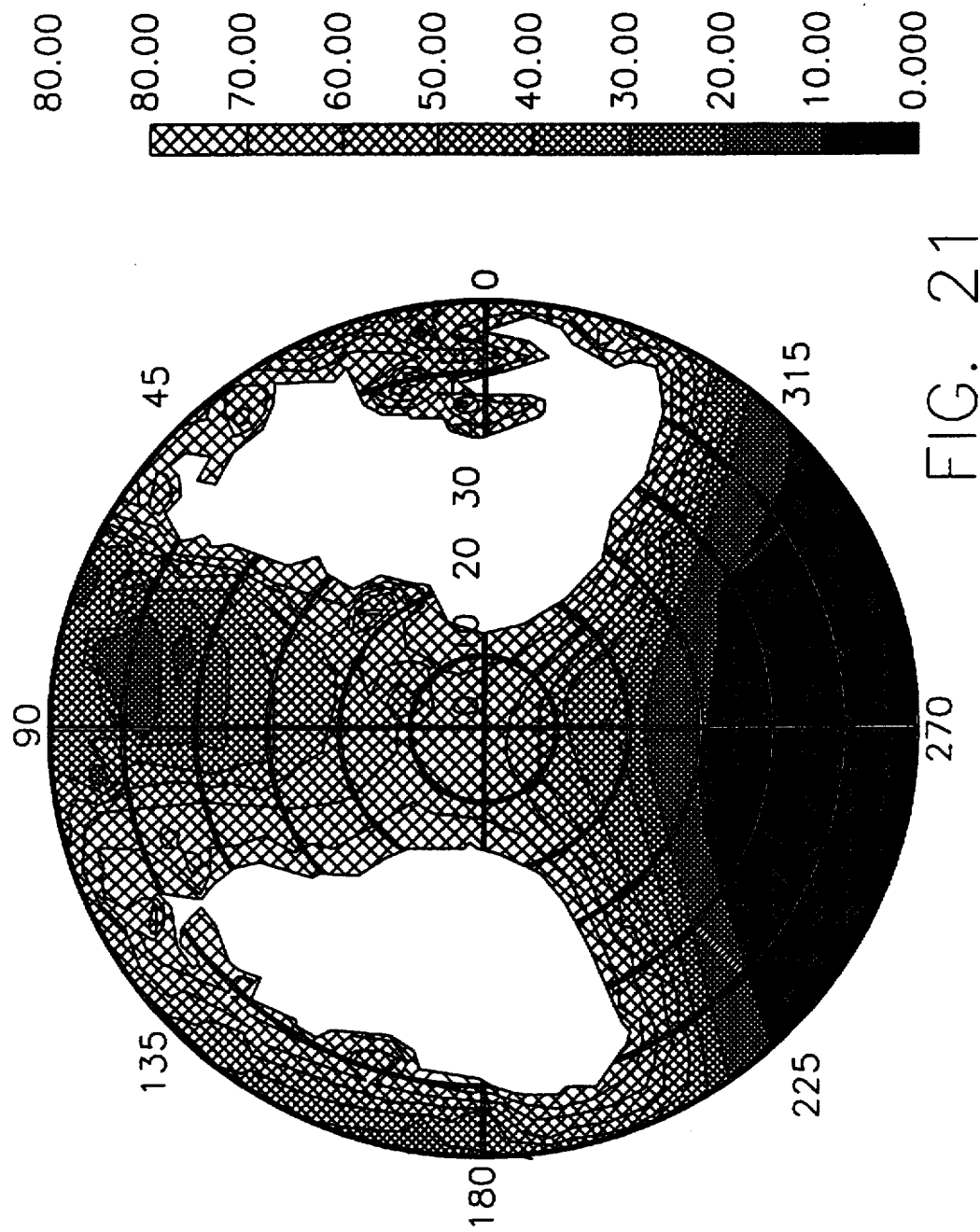
FIG. 21 is a white light contrast ratio graph of the Example 5 NW TN light valve having a cell gap "d" of 5.20 μm, an on-state driving voltage of 5.5 volts, and an off-state driving voltage of 1.7 volts.

In this fifth Example, an NW TN LV was manufactured and tested as follows. This LV is best illustrated by FIGS. 11 and 21 herein. From the rear forward, this LV included rear polarizer 5, adhesive 31, retarder 2, retarder 4, retarder 7, retarder 6, adhesive 32, buffing film 9, LC layer 10, front buffing film 11, and front polarizer 15. The optical axes of the various components were oriented as follows: $P_F$=45°, $P_R$=135°, $B_R$=135°, $B_F$=225°, $T_1$=45°, and $T_2$=135°. Retarders 2–6 were obtained from Fuji as discussed above in Example 3 and were configured as described. In this Example and all other examples herein, the tilt angle of retarders 2 and 6 varied in a decreasing manner through the thickness of the retarders going away from the corresponding adhesive of the unit. It is noted that in this particular Example, the order of layers 6, 7, and 32 was reversed as compared to previous Examples herein. FIG. 21 is a white light contrast ratio plot of the LV of this fifth Example, when 5.5 volts were applied in the on-state and 1.7 volts in the off-state. The LC layer of this fifth Example had a thickness of 5.20 µm. The maximum contrast ratio of this LV was 199.38, while the minimum was 0.52.

EXAMPLE 6

In this sixth Example, an NW TN LV having a LC thickness of 5.2 µm was made and tested as follows. This LV is best illustrated by FIGS. 3, 4, 7, and 22 herein. From the rear forward, the LC included the components illustrated in FIG. 3. They were oriented as follows: $P_F$ at 46°, $P_R$ at 135°, $B_R$ at 135°, $B_F$ at 225°, $T_1$ at 45°, and $T_2$ at 135°. The retarders were as described in Example 3.

Figure 22:
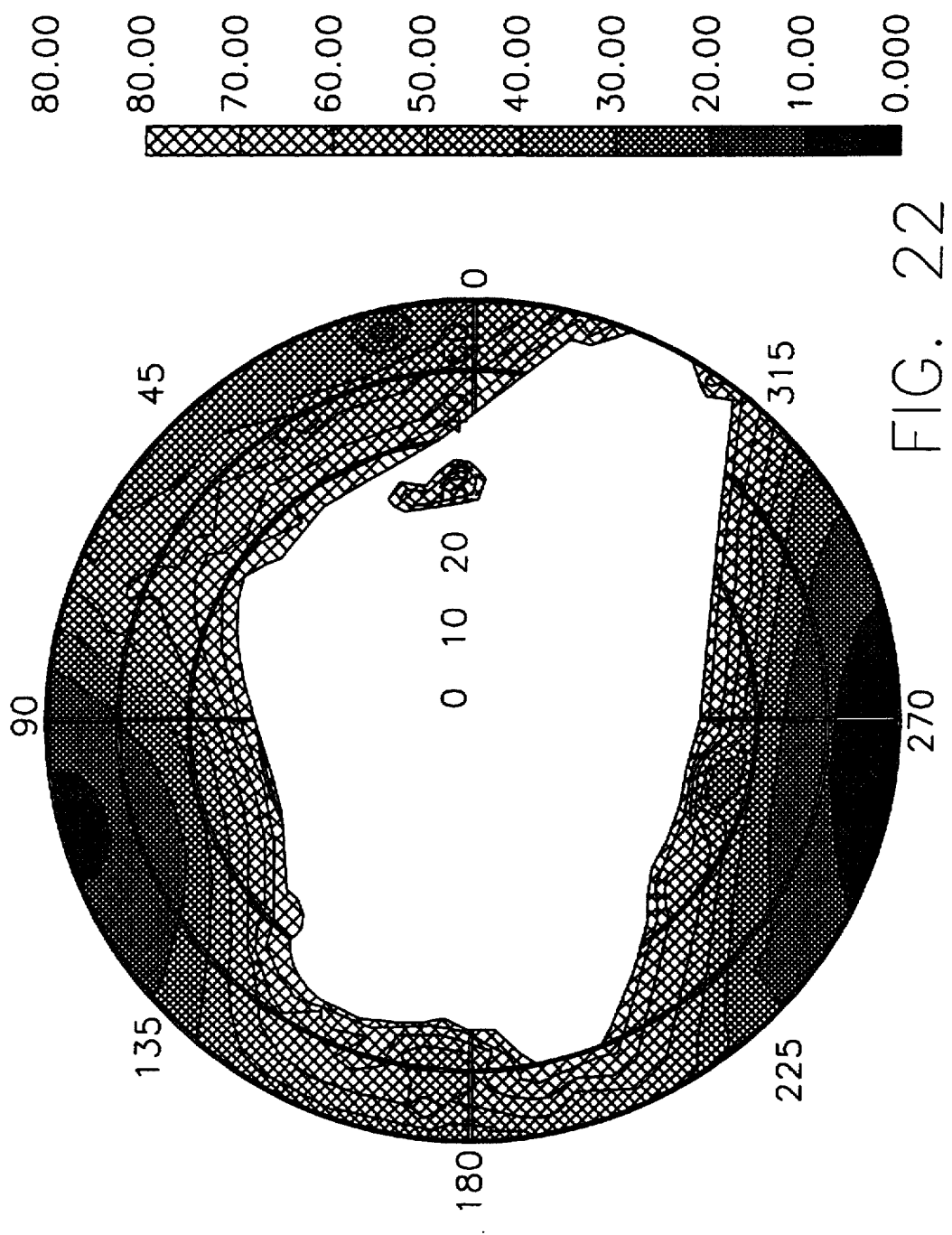
FIG. 22 is a white light contrast ratio graph of the Example 6 NW TN LV having a cell gap "d" of 5.2 μm, an on-state driving voltage of 5.5 volts, and an off-state driving voltage of 0 volts.

FIG. 22 is a white light contrast ratio plot of the NW LV of this sixth Example, when 5.5 volts were applied in the on-state and 0 volts in the off-state.

The maximum contrast ratio of this figure is 596.67 (at the cross) and the minimum contrast ratio was 4.16.

EXAMPLE 7

Figure 23:
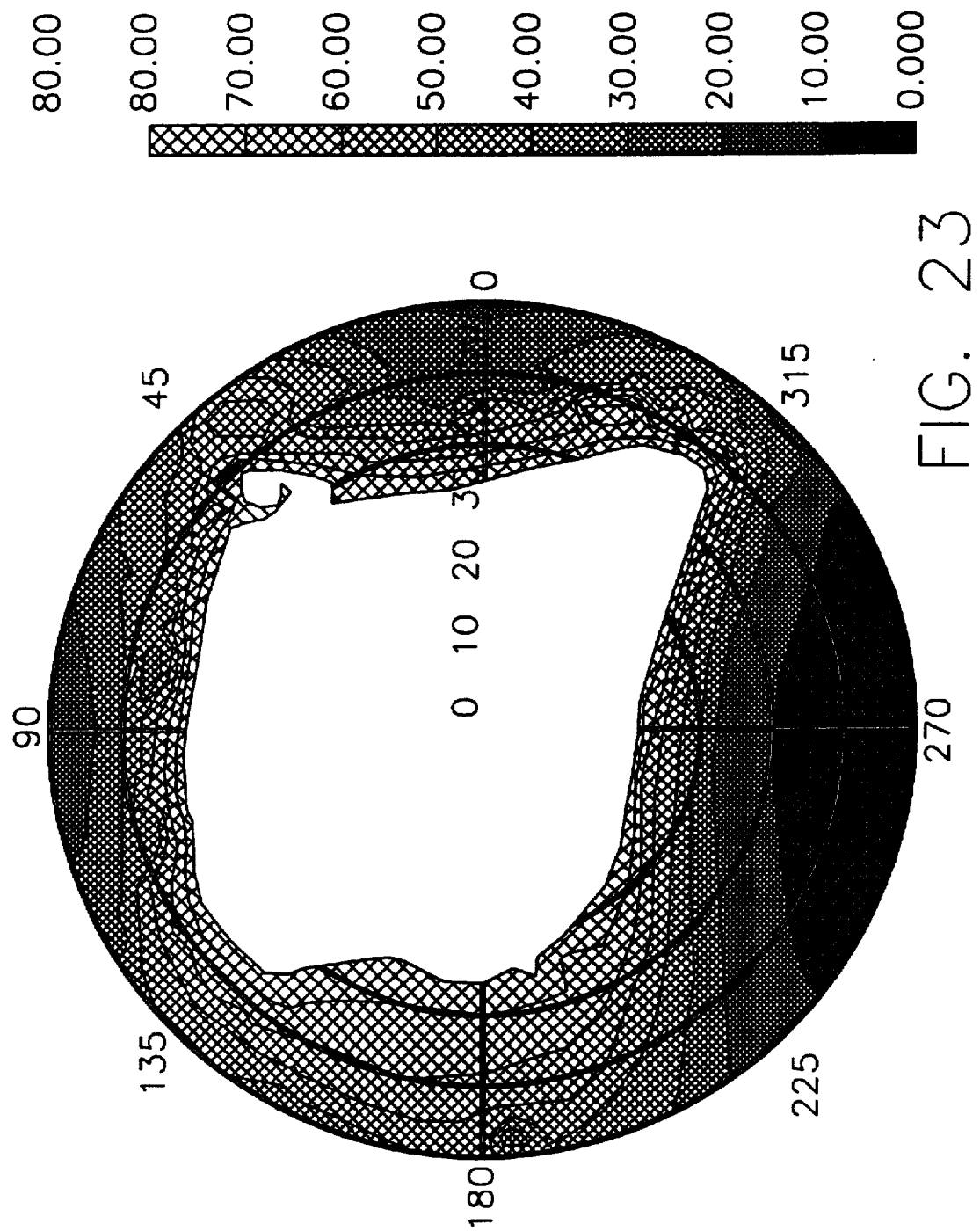
FIG. 23 is a white light contrast ratio graph of the Example 7 NW TN LV having a 5.20 µm cell gap, an on-state driving voltage of 5.5 volts, an off-state driving voltage of 0 volts, and a 100 nm negative uniaxial retarder (C-plate) disposed on the front side of the LC layer.

In this seventh Example, the LV of Example 6 was provided with a negative uniaxial retarder 16 on the front of the display, as shown in FIGS. 5 and 8, this retarder having a retardation value d·($n_x$−$n_z$) of 100 nm (C-plate). FIG. 23 is a white light contrast ratio graph for the NW LV of this seventh Example, including the C-plate, when 5.5 volts were applied in the on-state and 0 volts in the off-state. The maximum contrast ratio of this LV in this particular plot was 264.28, while the minimum was 2.05.

EXAMPLE 8

Figure 24:
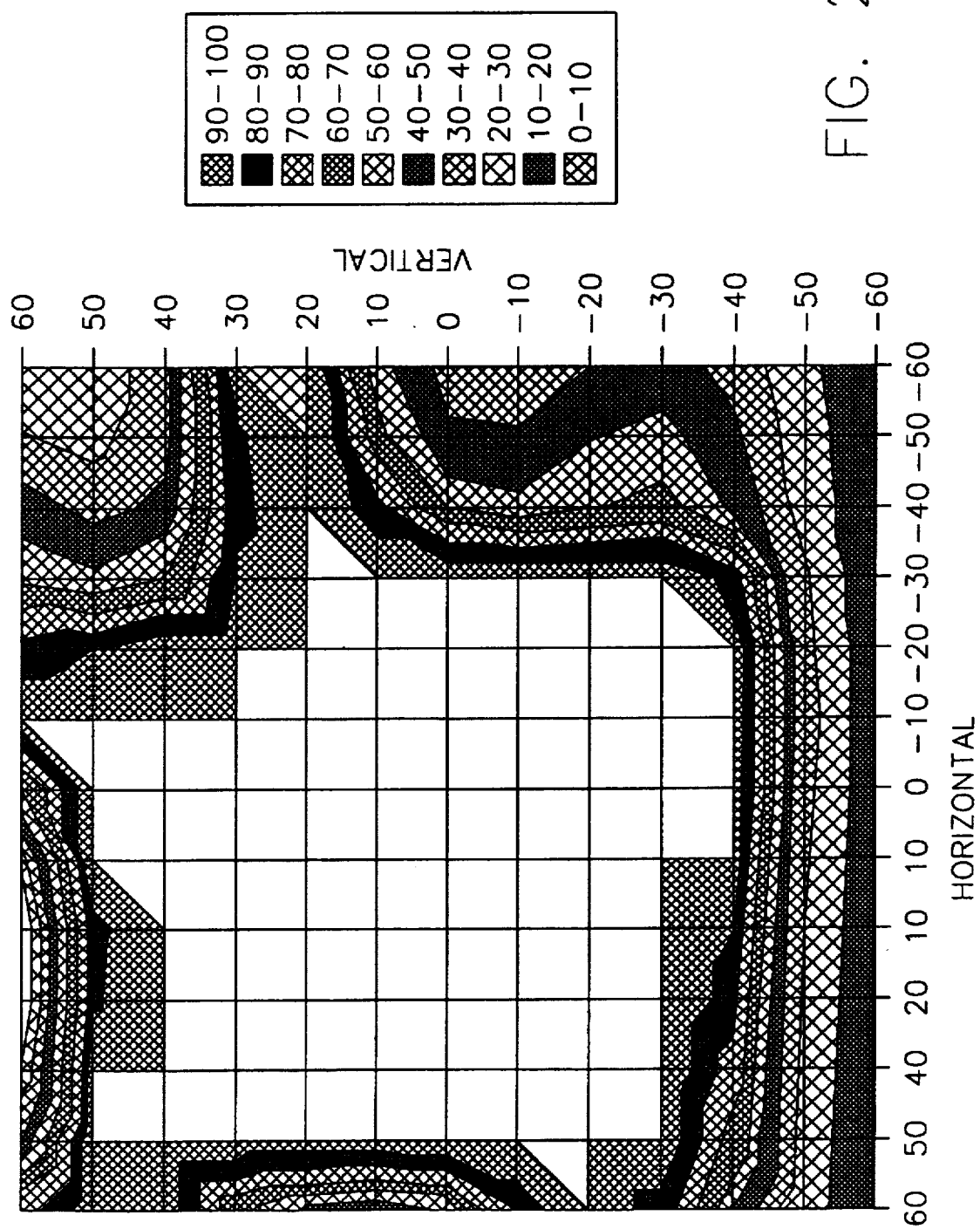
FIG. 24 is a green light (550 nm) simulated contrast ratio graph of the Example 8 simulation of an LV.

In this eighth Example, an NW TN LV was simulated based upon the algorithms described in Example 2. This simulated LV is fairly represented by FIGS. 1, 7, and 24 herein. From the rear forward, this LV included rear polarizer 5, negative tilted retarder 2, negative uniaxial retarder 4, negative tilted retarder 6, negative uniaxial retarder 7, rear orientation film 9 with buffing direction $B_R$, LC layer 10, front orientation film 11 with buffing direction $B_F$, and finally front polarizer 15. The thickness of LC layer 10 is 5.20 µm, while the birefringent value Δn of LC layer 10 was 0.084. Each of negative uniaxial retarders 4 and 7 were 1.0 µm thick, had no tilt, had an $n_e$ value of 1.52, and an $n_o$ value of 1.57. Thus, Δn ($n_e$−$n_o$) for each of retarders 4 and 7 was −0.05, while d·Δn was −50 nm for each of retarders 4 and 7. Meanwhile, each of tilted retarders 2 and 6 had a tilt which varied from 64° down to 4° throughout the thickness of the layers going toward LC layer 10. Furthermore, each of tilted retarders 2 and 6 had an $n_e$ value of 1.52 and an $n_o$ value of 1.57, and thus a Δn value of −0.05. Tilted retarder 2 was 2.5 µm thick while tilted retarder 6 was 2.9 µm thick. Thus, d·Δn of tilted retarder 2 was −125 nm while d·Δn of tilted retarder 6 was −145 nm. The optical axes of the components of this LV were as follows: $T_1$ at 222°, $B_F$ at 45°, $P_F$ at 47°, $T_2$ at 314°, $P_R$ at 137°, and $B_R$ at 315°. FIG. 24 is a green light contrast ratio graph of the LV of this eighth Example when 1.0 volts were applied in the off-state and 5.4 volts in the on-state. As can be seen, this LV exhibited excellent contrast, including a contrast ratio of at least 30:1 over a vertical angular span of at least about 100° and even up to about 110° at the −10° horizontal viewing angle. Furthermore, the LV of this Example exhibited contrast of at least about 30:1 over a horizontal angular span of at least about 80°, and even up to about 90° at the −20° and +20° vertical viewing angles.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A normally white twisted nematic liquid crystal display (LCD) comprising:

a twisted nematic liquid crystal layer for twisting at least one normally incident wavelength of visible light from about 80°–100° when in the off-state;

front and rear orientation means sandwiching said liquid crystal layer therebetween, said front orientation means including at least a front orientation direction and said rear orientation means including at least a rear orientation direction different than said front orientation direction;

first and second tilted retardation layers located on the rear side of said liquid crystal layer so as to be sandwiched between a rear polarizer and said liquid crystal layer, said second tilted retardation layer being disposed between said first tilted retardation layer and said liquid crystal layer;

each of said first and second tilted retardation layers having an optical axis defining an azimuthal angle, and a polar or inclined angle which varies through the thickness of the layer; and wherein said azimuthal angle of said first tilted retardation layer is oriented anti-parallel ±10° relative to said front orientation direction, and said azimuthal angle of said second tilted retardation layer is oriented parallel ±10° relative to said rear orientation direction, and said azimuthal angle of said second tilted retardation layer is parallel ±10° relative to a transmission axis of said rear polarizer.

2. The LCD of claim 1, wherein the azimuthal angle of said first tilted retardation layer is oriented perpendicular ±10° relative to the azimuthal angle of said second tilted retardation layer.

3. The LCD of claim 1, wherein each of said first and second tilted retardation layers is oriented relative to a backlight such that the side of each of said tilted retardation layers having the largest tilt or incline angle is closest to said backlight and is first hit by light emitted from said backlight.

4. The LCD of claim 1, further comprising first and second negative retardation layers on the rear side of said liquid crystal layer, each of said first and second negative retardation layers being defined by one of: (i) $n_x > n_y > n_z$; and (ii) $n_x = n_y > n_z$.

5. The LCD of claim 4, wherein each of said first and second tilted retardation layers has a negative birefringence and a retardation value $d \cdot (n_e - n_o)$ of from about −20 to −200 nm.

6. A normally white twisted nematic liquid crystal panel comprising:

a liquid crystal layer for twisting at least one normally incident visible wavelength of light as it passes therethrough when said liquid crystal layer is in substantially the off-state so as to define a twisted nematic normally white display;

rear and front orientation layers each having a different alignment direction;

at least one negative retarder means located on one side of said liquid crystal layer and having a retardation value $d \cdot (n_x - n_z)$ of from about 10 nm to 150 nm and a retardation value $d \cdot (n_x - n_y)$ of from about −20 nm to 20 nm;

rear and front polarizers, each having a different transmission axis;

first and second negative tilted retarder means on the same side of said liquid crystal layer as said at least one negative retarder means, each of said first and second tilted retarder means having a retardation value $d \cdot (n_e - n_o)$ of from about −20 to −200 nm;

wherein an azimuthal direction of the retardation axis of said first tilted retarder means is anti-parallel ±10° to the alignment direction of the orientation layer located on the opposite side of said liquid crystal layer; and wherein the transmission axis of the rear polarizer is parallel ±10° to the alignment direction of the rear orientation layer.

7. A method of making a normally white twisted nematic liquid crystal display comprising the steps of:

providing first and second negative tilted retarders whose tilt or incline angles vary in one direction through the thickness of the retarders;

providing first and second negative non-tilted retarders;

disposing a twisted nematic liquid crystal layer on one side of said tilted and non-tilted retarders; and orienting said tilted and non-tilted retarders so that the resulting display outputs contrast ratios of at least about 90:1 or 90 over a horizontal viewing angle span of at least about 120° at a given vertical viewing angle.

8. The method of claim 7, further including the step of orienting the retarders so that the display outputs contrast ratios of at least about 100:1 or 100 at the 15° vertical viewing angle over a horizontal angular span of at least about 110°.

9. A normally white twisted nematic liquid crystal display comprising:

a twisted nematic liquid crystal layer;

first and second negative tilted retarder layers located on a first side of said liquid crystal layer, each of said first and second negative tilted retarder layers defining a tilt or incline angle which varies in at least one direction throughout the thickness of the layer;

first and second polarizers located on opposite sides of said liquid crystal layer, said first polarizer being located on the same side of said liquid crystal layer as said first and second negative tilted retarder layers;

first and second orientation layers having first and second orientation directions, respectively, said first orientation layer with said first orientation direction being located on the same side of said liquid crystal layer as said first polarizer, and said second orientation layer with said second orientation direction being located on the same side of said liquid crystal layer as said second polarizer;

said first polarizer having a transmission axis oriented parallel ±10° (substantially parallel) to said first orientation direction, and said second polarizer having a transmission axis oriented parallel ±10° (substantially parallel) to said second orientation direction; and wherein the transmission axis of said first polarizer is oriented perpendicular ±10° to the azimuthal element of the optical axis ($T_1$) of said first tilted retarder layer, and wherein said first tilted retarder layer is located in between said first polarizer and said second tilted retarder layer.

10. The display of claim 9, wherein said first and second negative tilted retarder layers and said polarizers and said orientation directions are oriented relative to one another so that the display outputs contrast ratios of at least about 90:1 over a horizontal viewing angle span of at least about 120° at a given vertical viewing angle.

11. The display of claim 9, wherein said retarders, orientation layers, and polarizers are oriented so that the display exhibits a contrast ratio of at least about 100:1 or 100 at the 15° vertical viewing angle over a horizontal angular span of at least about 110°.

12. The display of claim 9, further comprising first and second non-tilted negative retarder layers on the same side of said liquid crystal layer as said first and second tilted retarders.

13. The display of claim 12, wherein said first non-tilted negative retarder is located between said first and second tilted retarders, and said second non-tilted retarder is located in between said second tilted retarder and said liquid crystal layer.

14. The display of claim 13, wherein each of said first and second negative non-tilted retarder layers has a retardation value $d \cdot (n_x - n_z)$ of from about 10–150 nm +20 nm and a retardation value $d \cdot (n_x - n_y)$ of from about −20 to +20 nm.

15. The display of claim 13, wherein each of said first and second negative tilted retarder layers has a retardation value $d \cdot (n_e - n_o)$ of from about −20 to −200 nm.

16. The display of claim 15, wherein each of said tilted retarder layers has a retardation value $d \cdot (n_e - n_o)$ of from about −100 to −150 nm.

17. A normally white twisted nematic liquid crystal display comprising:

a liquid crystal layer for twisting at least one normally incident visible wavelength of light as it passes therethrough when said liquid crystal layer is in substantially the off-state so as to define a twisted nematic normally white display;

at least one orientation layer in contact with said liquid crystal layer, said orientation layer having an alignment direction;

at least one negative retarder located on one side of said liquid crystal layer and having a retardation value $d \cdot (n_x - n_z)$ of from about 10–150 nm and a retardation value $d \cdot (n_x - n_y)$ of from about −20 to +20 nm;

at least one polarizer;

first and second negative tilted retarders, each of said first and second negative tilted retarders having a retardation value $d \cdot (n_e - n_o)$ of from about −20 to −200 nm; and wherein each of said negative retarder, said first negative tilted retarder, and said second negative tilted retarder are oriented relative to one another so that the display outputs contrast ratios of at least about 90:1 or 90 over a horizontal viewing angle span of at least about 120° at a given vertical viewing angle.

* * * * *